United States Patent
Yan et al.

(10) Patent No.: US 11,847,843 B2
(45) Date of Patent: Dec. 19, 2023

(54) UNDER-SCREEN OPTICAL FINGERPRINT IDENTIFICATION APPARATUS AND FINGERPRINT IDENTIFICATION METHOD

(71) Applicant: Silead Inc., Shanghai (CN)

(72) Inventors: Fengyun Yan, Shanghai (CN); Zhanqi Xie, Shanghai (CN); Yungang Sun, Shanghai (CN); Zhenguo Yang, Shanghai (CN); Xiaochi Zhang, Shanghai (CN)

(73) Assignee: Silead Inc., Shanghai (CN)

( * ) Notice: Subject to any disclaimer, the term of this patent is extended or adjusted under 35 U.S.C. 154(b) by 0 days.

(21) Appl. No.: 17/946,553

(22) Filed: Sep. 16, 2022

(65) Prior Publication Data

US 2023/0010056 A1 Jan. 12, 2023

Related U.S. Application Data

(63) Continuation of application No. PCT/CN2020/079864, filed on Mar. 18, 2020.

(51) Int. Cl.
*G06V 40/13* (2022.01)
*G06V 20/64* (2022.01)
(Continued)

(52) U.S. Cl.
CPC ............ *G06V 20/647* (2022.01); *G06V 10/10* (2022.01); *G06V 40/1318* (2022.01); *G06V 40/1347* (2022.01); *G06V 40/1365* (2022.01)

(58) Field of Classification Search
None
See application file for complete search history.

(56) References Cited

U.S. PATENT DOCUMENTS

| | | | | |
|---|---|---|---|---|
| 11,017,200 B1* | 5/2021 | Wickboldt | ............ | H04M 1/026 |
| 2019/0026523 A1* | 1/2019 | Shen | .................... | G02B 6/4203 |
| 2021/0064837 A1* | 3/2021 | Zeng | .................... | G06V 10/147 |

FOREIGN PATENT DOCUMENTS

| CN | 107004130 A | 8/2017 |
|---|---|---|
| CN | 109154959 A | 1/2019 |

(Continued)

OTHER PUBLICATIONS

International search report issued for counterpart Chinese patent application No. PCT/CN2020/079864 dated Dec. 14, 2020 (4 pages).

*Primary Examiner* — Joseph R Haley
(74) *Attorney, Agent, or Firm* — Nutter McClennen & Fish LLP

(57) ABSTRACT

The present disclosure provides an under-screen optical fingerprint identification apparatus and a fingerprint identification method. The under-screen optical fingerprint identification apparatus comprises: a photodetection array which has a photosensitive area on which a photosensitive pixel array is provided, wherein the photosensitive pixel array comprises at least three types of pixels; and a fingerprint contact identification area located above the photodetection array and comprising a light-emitting layer and a cover layer, wherein the cover layer has a contact area, and the light-emitting layer has an identification area corresponding to the contact area, wherein the identification area comprises light-emitting units, each of which comprises a light-transmitting area and at least three light-emitting areas located therearound for emitting detection light of corresponding wavebands, wherein the detection light is reflected by an object to be identified to form signal light which passes through the filter layers and reaches corresponding three types of pixels.

20 Claims, 10 Drawing Sheets

(51) Int. Cl.
    *G06V 10/10*     (2022.01)
    *G06V 40/12*     (2022.01)

(56) References Cited

FOREIGN PATENT DOCUMENTS

| CN | 109716353 A | 5/2019 |
|----|-------------|--------|
| CN | 209640880 U | 11/2019 |
| CN | 110582780 A | 12/2019 |
| CN | 110728250 A | 1/2020 |

* cited by examiner

UNDER-SCREEN OPTICAL FINGERPRINT IDENTIFICATION APPARATUS AND FINGERPRINT IDENTIFICATION METHOD

CROSS-REFERENCE TO RELATED APPLICATION

This application is a continuation of International Application No. PCT/CN2020/079864, filed on Mar. 18, 2020, which is hereby incorporated by reference in its entirety.

TECHNICAL FIELD

The present disclosure relates to the field of fingerprint identifications, and particularly to an under-screen optical fingerprint identification apparatus and a fingerprint identification method.

BACKGROUND

The under-screen optical fingerprint identification may be applied to electronic devices, including but not limited to a smart phone or any other electronic device with a human-computer interaction function. The existing under-screen fingerprint module is generally provided under a display screen of an electronic device, and at least includes a fingerprint chip. At present, an excitation light source for realizing the under-screen optical fingerprint identification may be an additional light source additionally configured in the electronic device, or a self-luminous display screen, such as an OLED screen, self-contained by the electronic device. The excitation light source emits detection light (usually including all visible light, such as white light) to a user's finger. After being reflected by the user's finger, the detection light forms a signal light carrying the user's fingerprint information and the signal light propagates downward to the fingerprint chip. The fingerprint chip performs a photoelectric signal conversion to obtain a fingerprint image including finger valley information and finger ridge information.

However, the fingerprint image collected based on the above fingerprint identification technology is a planar black-and-white texture image, which can only reflect a black-and-white contrast between the finger valley and the finger ridge. By utilizing a black-and-white fingerprint image printed with the user's finger or a fingerprint film made by imitating the finger texture, a fingerprint attacker may cause the above under-screen fingerprint module to collect a fingerprint image the same as that of the user's finger. In fact, the fluctuation of the finger valley and the finger ridge of the user's real finger has three-dimensional stereoscopic features, and carries skin color information. When the touch screen is pressed, the real finger is obviously different from the imitated fingerprint mold (e.g., the user's finger imitated by 3D printing) in three-dimensional details, including differences between the real finger and the imitated fingerprint mold in softness, light absorption or reflection. Therefore, it is easy to be attacked by a prosthesis to only collect the fingerprint's planar black-and-white texture image, which leads to a poor anti-counterfeiting effect of fingerprint identification.

In the prior art, there are solutions for fingerprint identification and anti-counterfeiting. Known embodiments, such as those provided by publication No. CN109154959A and CN107004130A, detect whether a captured or detected fingerprint image comes from a finger of a living person by identifying whether the finger is a "living finger". However, the fingerprint image obtained by those known embodiments is still a planar image or a two-dimensional figure, which cannot truly reflect the three-dimensional appearance of the user's finger, and the anti-counterfeiting effect still needs to be improved.

SUMMARY

Based on the above defects of the prior art, the embodiments of the present disclosure provide an under-screen optical fingerprint identification apparatus and a fingerprint identification method, which can collect a three-dimensional or stereoscopic fingerprint image, and the anti-counterfeiting effect is better.

In order to achieve the above objectives, the present disclosure provides the following technical solutions.

An under-screen optical fingerprint identification apparatus has at least an operating state, and comprises:
a photodetection array which has a photosensitive area on which a photosensitive pixel array is provided, wherein the photosensitive pixel array comprises at least three types of pixels, and at least three different filter layers are correspondingly provided on surfaces of or above the three types of pixels; and
a fingerprint contact identification area which is located above the photodetection array, wherein the fingerprint contact identification area comprises a light-emitting layer and a cover layer located thereabove, wherein the cover layer has a contact area to be contacted by an object to be identified, and the light-emitting layer has an identification area corresponding to the contact area, wherein the identification area comprises a plurality of light-emitting units, each of which comprises a light-transmitting area, and at least three light-emitting areas located around the light-transmitting area, wherein the at least three light-emitting areas correspondingly emit detection light of different wavebands from at least three different angles relative to the contact area;
wherein when the under-screen optical fingerprint identification apparatus is in the operating state, the at least three light-emitting areas emit detection light to the object to be identified, and signal light formed by the detection light being reflected by the object to be identified propagates to the photosensitive pixel array through the light-transmitting area and the filter layers, wherein the three types of pixels correspondingly receive the signal light formed by the detection light from at least three different incident angles being reflected by the object to be identified.

A method for utilizing the under-screen optical fingerprint identification apparatus described in the embodiments, wherein photosensitive pixels of the same type form a image output unit, and the photodetection array comprises at least three image output units,
wherein the method comprises the following steps:
controlling detection light of different wavebands emitted by at least three light-emitting areas in the plurality of light-emitting units to be incident at different angles onto the object to be identified which presses on the contact area, wherein the signal light formed by the detection light at different angles being reflected by the object to be identified passes through the light-transmitting area and the filter layers and then reaches corresponding types of photosensitive pixels; and receiving, by each of the image output units, signal light of the same waveband and outputting, by each of the image output units, a set of original images of the corresponding waveband;

constructing a three-dimensional stereoscopic image of the object to be identified according to the original images output by the at least three image output units.

The embodiments of the present disclosure may construct the three-dimensional stereoscopic features of the user's fingerprint by using lights of a plurality of different wavebands and at different incident angles, thereby improving the anti-counterfeiting effect of fingerprint identification.

With reference to the following description and drawings, specific embodiments of the present disclosure are disclosed in detail, and the ways in which the principle of the present disclosure can be adopted are pointed out. It should be understood that the embodiments of the present disclosure are not limited thereto in scope.

Features described and/or illustrated for one embodiment can be used in one or more other embodiments in a same or similar way, and combined with or substituted for features in other embodiments.

It should be emphasized that the term "include/contain" used herein refers to the presence of features, integers, steps or components, but does not exclude the presence or addition of one or more other features, integers, steps or components.

BRIEF DESCRIPTION OF THE DRAWINGS

The drawings described herein are for explanatory purposes only, and are not intended to limit the scope disclosed by the present disclosure in any way. In addition, the shapes and scales of the various components in the drawings are only schematic to help the understanding of the present disclosure, rather than specifically limiting the shapes and scales of the various components of the present invention. Under the teachings of the present disclosure, persons skilled in the art can choose various possible shapes and scales according to specific conditions to implement the present disclosure. In the drawings.

DETAILED DESCRIPTION

In order for better understanding by persons skilled in the art, the technical solutions in the embodiments of the present disclosure will be described clearly and completely below with reference to the accompanying drawings in the embodiments of the present invention. Obviously, those described are only a part, rather than all, of the embodiments of the present disclosure. Based on the embodiments of the present disclosure, any other embodiment obtained by those of ordinary skills in the art without any creative effort should fall within the protection scope of the present disclosure.

It should be noted that when an element is referred to as being "provided on" another element, it may be directly located on another element or there may be an intervening element. When an element is considered to be "connected to" another element, it may be directly connected to another element or there may be an intervening element. The terms "vertical", "horizontal", "left", "right" and similar expressions used herein are for illustration purposes only, and are not meant to indicate a unique embodiment.

Unless otherwise defined, all the technical and scientific terms used herein have the meanings the same as those generally understood by those skilled in the technical field of the present disclosure. The terms used in the specification of the present disclosure are only for the purpose of describing the specific embodiments, and are not intended to limit the present disclosure. The term "and/or" used herein includes any and all combinations of one or more related listed items.

The embodiments of the present disclosure provide an under-screen optical fingerprint identification apparatus and a fingerprint identification method utilizing the same. The under-screen optical fingerprint identification apparatus may be applied or configured in an electronic device, including but not limited to, a smart phone, a tablet electronic device, a computer, a GPS navigator, a smart wearable device and a personal digital assistant.

Figure 1:
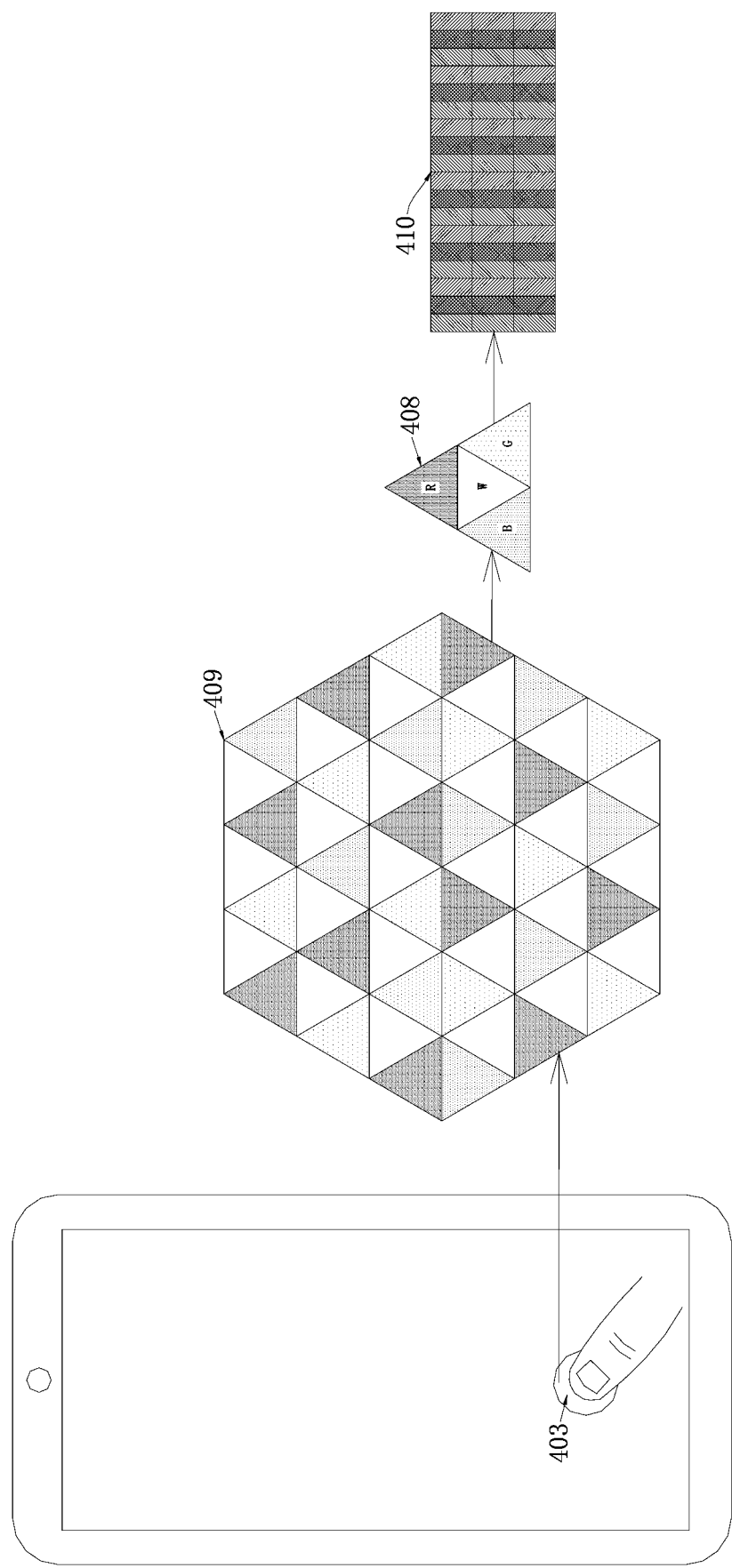
FIG. 1 illustrates a schematic structural diagram of an under-screen optical fingerprint identification apparatus according to a non-limiting embodiment of the present disclosure.
Figure 2:
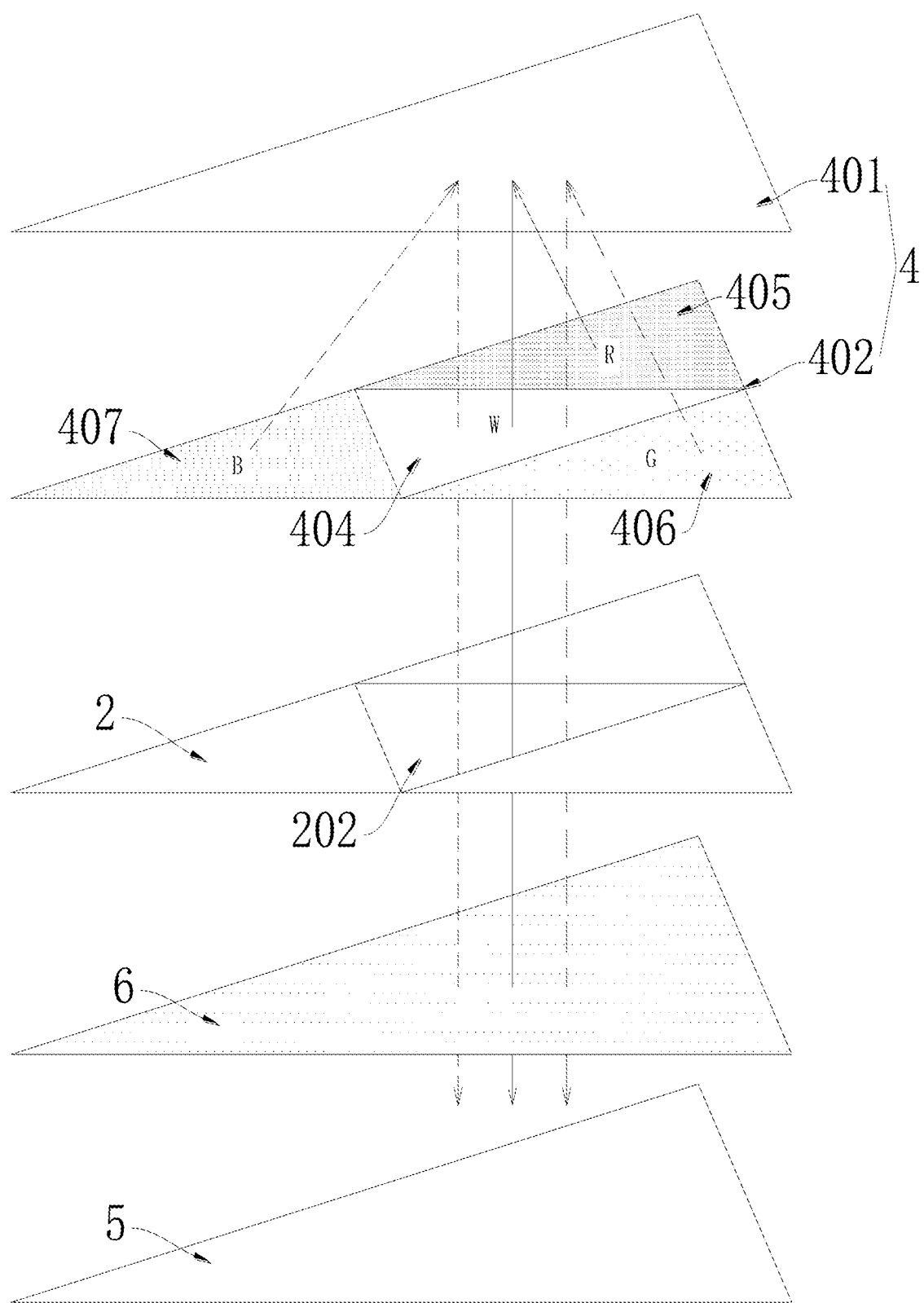
FIG. 2 illustrates a schematic optical path diagram of an under-screen optical fingerprint identification apparatus according to a non-limiting embodiment of the present disclosure.
Figure 3:
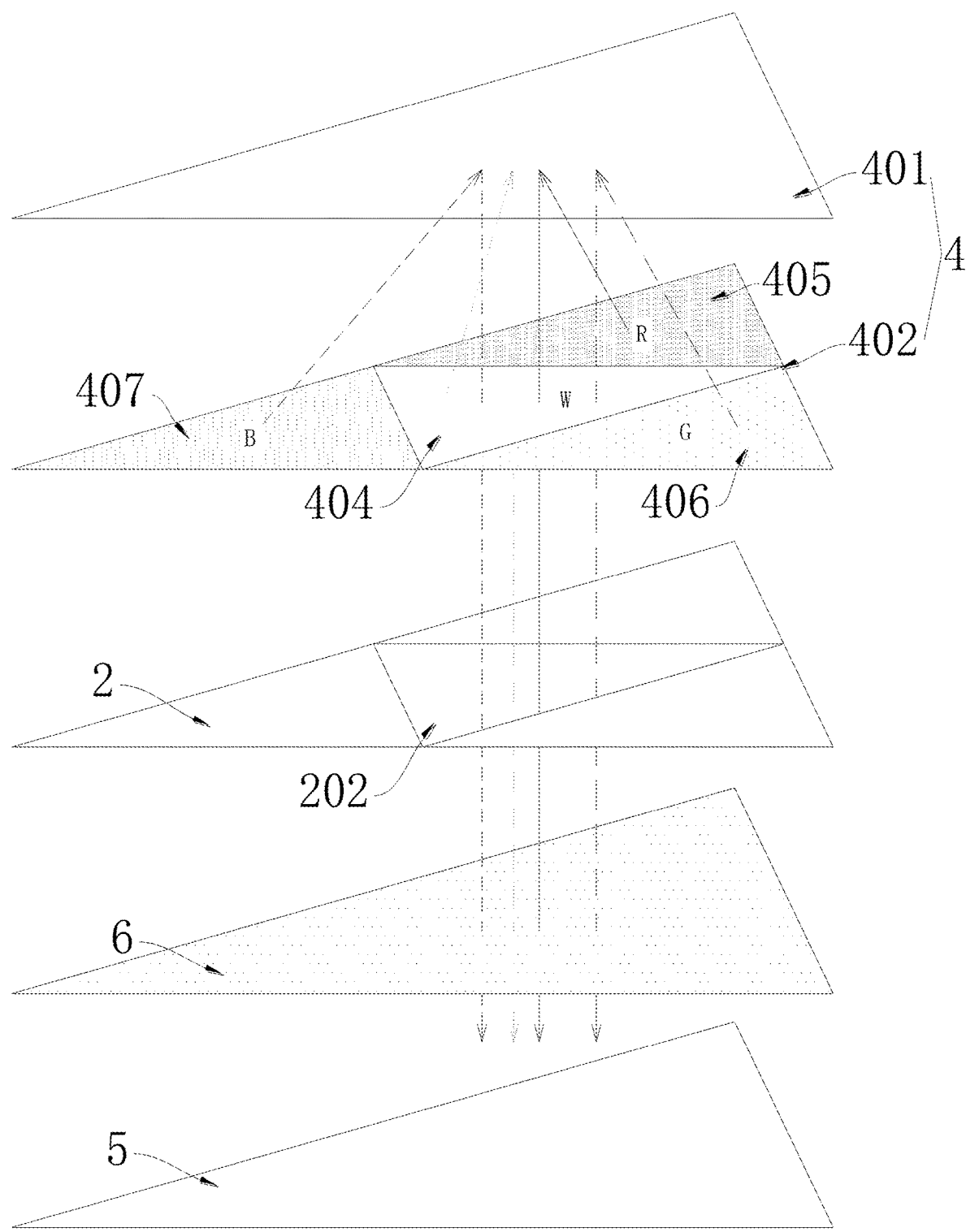
FIG. 3 illustrates a schematic optical path diagram of an under-screen optical fingerprint identification apparatus according to another non-limiting embodiment of the present disclosure.
Figure 4:
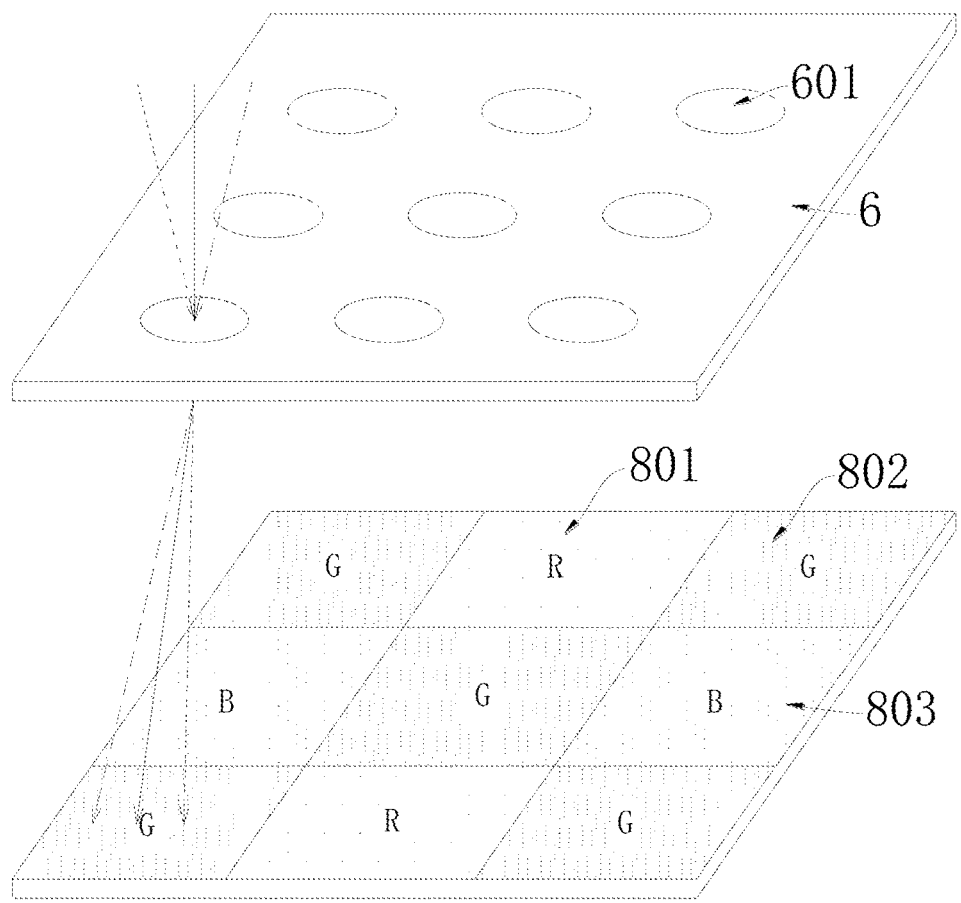
FIG. 4 illustrates a diagram of a corresponding relationship between a micro-lens array and a photosensitive pixel array.

As illustrated in FIGS. 1 to 3, an under-screen optical fingerprint identification apparatus according to an embodiment of the present disclosure may comprise a fingerprint contact identification area 4 and a photodetection array 5. In one embodiment, the fingerprint contact identification area 4 may be provided on a display screen configured in an electronic device (e.g., a smart phone) to which the under-screen optical fingerprint identification apparatus according to the embodiment of the present disclosure is applied. Or, in other words, a part of the display screen self-contained by the electronic device using or configured with the under-screen optical fingerprint identification apparatus according to the embodiment of the present disclosure constitutes the fingerprint contact identification area 4. In this way, when the under-screen optical fingerprint identification apparatus according to the embodiment of the present disclosure is actually applied to the electronic device, the emission of detection light described below can be realized without providing an additional excitation light source, so that the volume of the apparatus can be reduced, which is beneficial to the downsizing and light-weight design of the electronic device.

Of course, the fingerprint contact identification area 4 is not limited to the above embodiment. In other feasible embodiments, the fingerprint contact identification area 4 may include an additional excitation light source, which is not limited in this embodiment.

In the above embodiment, the display panel may adopt a self-luminous unit as a self-luminous display screen, such as an OLED screen or an LED screen, to display pixels. The display screen may further be a touch display screen, which can not only display the screen, but also detect the user's touch or pressing operation, thereby providing a human-machine interaction interface for the user. In a specific embodiment, the electronic device may be configured with a touch sensor, specifically a touch panel, which may be provided on the surface of the display screen, or may be partially or integrally integrated inside the display screen to form the touch display screen.

The above self-luminous display screen may be used as an excitation light source to emit detection light to an object to be identified (e.g., a user's finger, a printed fingerprint image, an imitated fingerprint film, an imitated fingerprint mold, etc.) that presses, approaches or touches (collectively referred to as "press" for the convenience of description in the present disclosure) thereon, and the detection light is reflected by the object to be identified to form signal light, which propagates downward and finally reaches the photodetection array 5.

Figure 6:
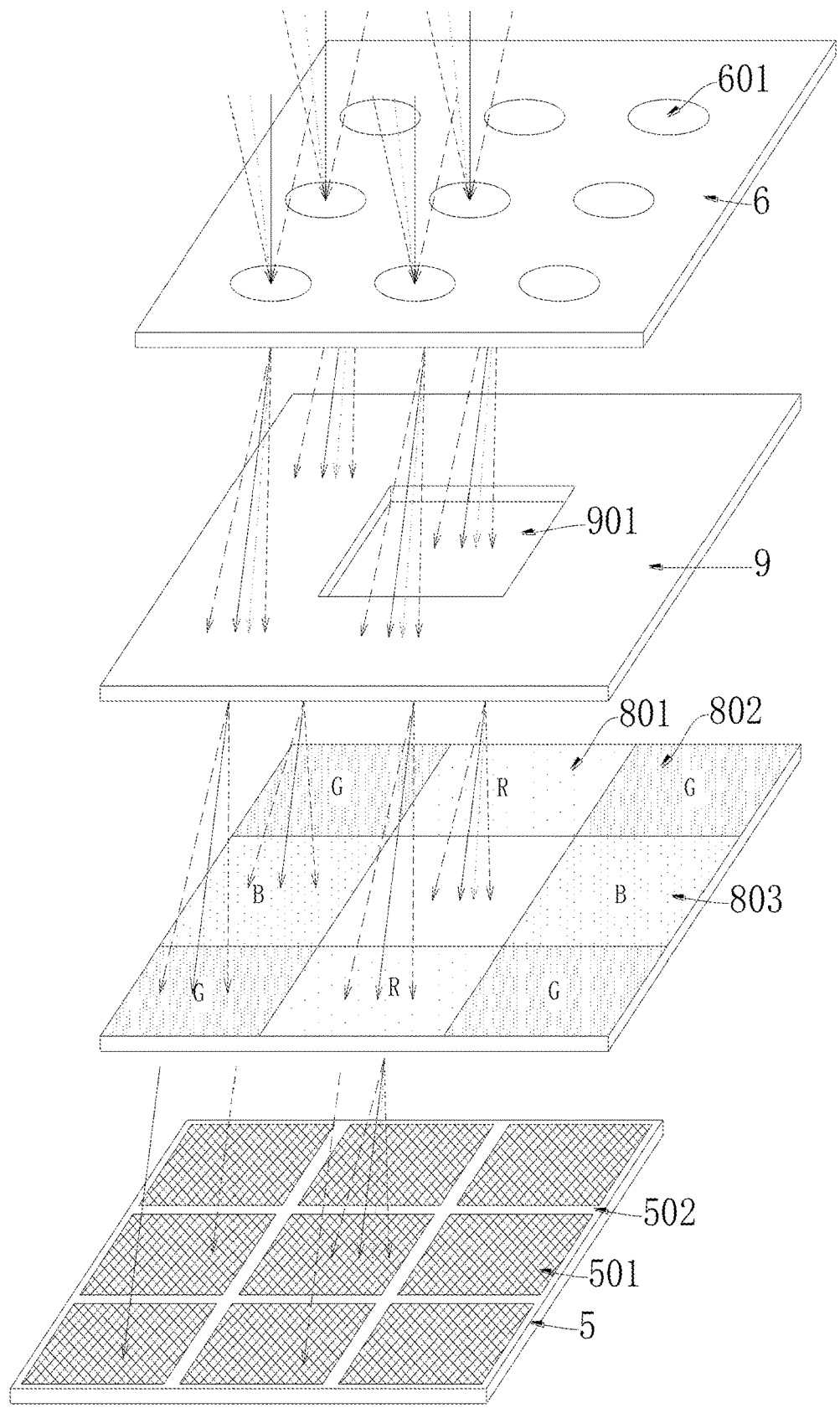
FIG. 6 illustrates a propagation path diagram of signal light in a feasible embodiment.
Figure 7:
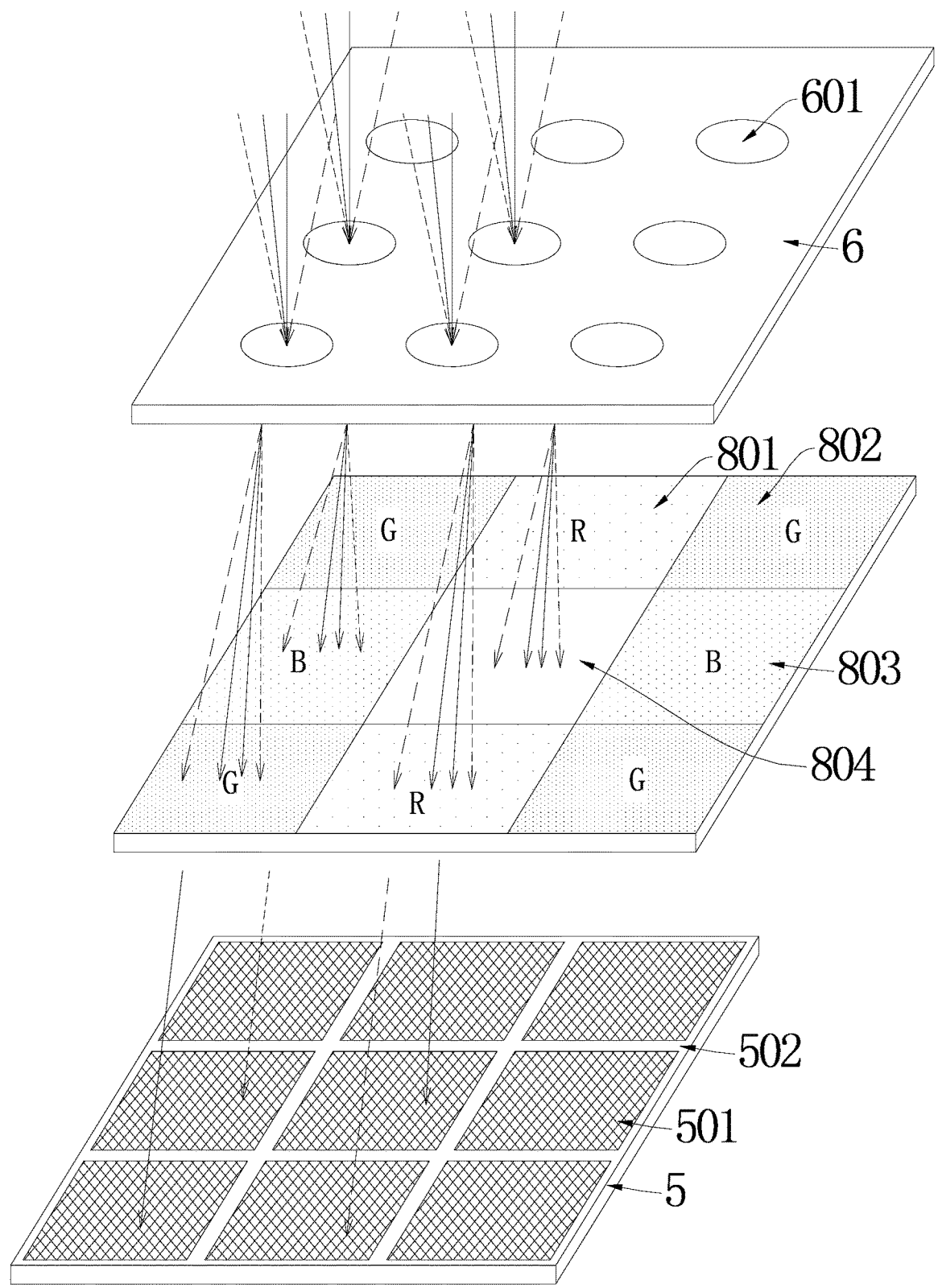
FIG. 7 illustrates a propagation path diagram of signal light in another feasible embodiment.
Figure 8:
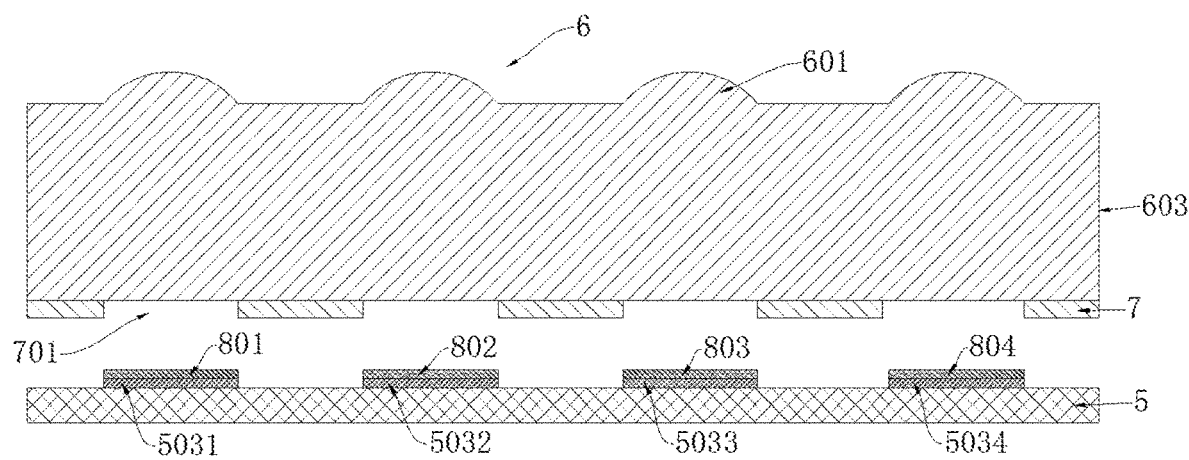
FIG. 8 illustrates a propagation path diagram of signal light between a micro-lens array and a photosensitive pixel array.

The photodetection array 5 may be a part of a fingerprint chip. Generally, the fingerprint chip may comprise a photosensitive area on which a photosensitive pixel array may be provided, and a non-photosensitive area on which a processing circuit (an image processor) in signal connection with the photosensitive pixel array may be provided. Therefore, the portion of the fingerprint chip provided with the photosensitive pixel array may be defined as the photodetection array 5. As illustrated in FIGS. 6, 7 and 8, a photosensitive area 502 of the photodetection array 5 is provided with a photosensitive pixel array 501, which includes photosensitive pixels arranged in a rectangular array n×m for receiving signal light and sensing an intensity of the signal light.

The photodetection array 5 is provided below the fingerprint contact identification area 4. Specifically, an electronic device such as a smart phone is provided with a middle frame, through which the photodetection array 5 is provided and fixed below the fingerprint contact identification area 4. The photodetection array 5 is configured to convert the received light signal into an electrical signal to generate a fingerprint image, and further send the fingerprint image to a processing circuit in signal connection therewith. The processing circuit performs image processing to obtain a fingerprint signal, and performs fingerprint identification on the fingerprint signal through an algorithm to judge whether the object to be identified is the user's real finger.

Specifically, the smart phone pre-records the fingerprint image information of the user's real finger and stores it in a local information base. During the fingerprint identification, the generated fingerprint image is compared with a standard fingerprint image stored in the information base. When a comparison result shows that the similarity between the above two fingerprint images reaches a set threshold, it is considered that the generated fingerprint image is matched with the standard fingerprint image, and it is judged that the current object to be identified is the user's real finger. Subsequently, the smart phone completes operations such as screen unlocking, a successful permission acquisition (in scenarios such as payment, login, etc.), and the like.

On the contrary, if the comparison result shows that the similarity between the above two fingerprint images is lower than the set threshold, it is considered that the generated fingerprint image does not match the standard fingerprint image, and it is judged that the current object to be identified is an attacking prosthesis such as a printed fingerprint image, an imitated fingerprint film or fingerprint mold. The smart phone continues to maintain the current operation interface such as screen locking, a failed permission acquisition, etc.

In the embodiments illustrated in FIGS. 2 to 6, an optical structure may be provided between the photodetection array 5 and the fingerprint contact identification area 4. The optical structure comprises a micro-lens array 6, which comprises micro-lenses 601 one-to-one corresponding to photosensitive pixels (5031, 5032, 5033 and 5034 as illustrated in FIG. 8) in the photosensitive pixel array 501. As illustrated in combined with FIG. 8, a second light-shielding layer 7 may be provided between the micro-lens array 6 and the photodetection array 5, and specifically, the second light-shielding layer 7 may be provided on a lower surface of the micro-lens array 6, and may be provided with second light-transmitting holes 701 one-to-one corresponding to the photosensitive pixels and the micro-lenses 601. In this way, the signal light reaches the photosensitive pixels after being converged and corrected by the micro-lenses 601, and the imaging quality is improved.

The micro-lens array 6 may include a light-transmitting carrier 603, and the micro-lenses 601 are substantially circular convex structures, which are formed on an upper surface of the light-transmitting carrier 603 and arranged in a rectangular array n×m, so as to be one-to-one corresponding to the photosensitive pixels. The second light-shielding layer 7 is thin in thickness and may be compounded on a lower surface of the light-transmitting carrier 603 to form an integral structure with the micro-lens array 6.

As illustrated in FIGS. 2 and 3, the fingerprint contact identification area 4 comprises a light-emitting layer 402 and a cover layer 401 located above the light-emitting layer 402. Since usually being provided without affecting the optical path, the cover layer 401 is generally made of a light-transmitting material. But in other embodiments, the cover layer 401 is not necessarily limited to a fully light-transmitting material due to its special design. The light-emitting layer 402 can emit light for screen displaying and fingerprint identification. For example, taking the fingerprint contact identification area 4 being an OLED screen as an example, the light-emitting layer 402 is an OLED layer. The cover layer 401 may be a protective cover plate compounded on an upper surface of the light-emitting layer 402 to protect the light-emitting layer 402, including a cover glass, a sapphire cover plate, etc., and an upper surface of the cover layer 401 may also be provided with a protective layer such as a protective film. Therefore, in the embodiments of the present disclosure, the so-called pressing the fingerprint contact identification area 4 by the object to be identified actually may be pressing the cover layer 401 or the protective layer by the object to be identified.

As illustrated in combined with FIG. 1, the cover layer 401 has a contact area 403 for the object to be identified to contact, and the light-emitting layer 402 has an identification area 409 corresponding to the contact area 403. In which, the upper surface of the cover layer 401 may constitute the contact area 403. As illustrated in combined with FIGS. 9 to 11, the identification area 409 includes a plurality of light-emitting units 408 each including a light-transmitting area 404 and at least three light-emitting areas located around the light-transmitting area 404.

Each of the light-emitting areas has a light-emitting pixel array 410 which comprises target light-emitting pixels.

When the under-screen optical fingerprint identification apparatus is in an operating state, at least part of the target light-emitting pixels operate, and the detection light emitted from each of the light-emitting areas is monochromatic light of the same waveband.

Specifically, the light-emitting pixel array 410 in the light-emitting areas may include three types of (i.e., R, G and B) light-emitting pixels. Thus, any one of the three types of (i.e., R, G and B) light-emitting pixels is the target light-emitting pixel (e.g., R light-emitting pixel), and the other two are non-target light-emitting pixels (G and B light-emitting pixels). When the under-screen optical fingerprint identification apparatus is in the operating state, at least part of the target light-emitting pixels operate, while the non-target light-emitting pixels do not operate. Therefore, the light-emitting areas emits monochromatic detection light of the same waveband.

In which, the "at least part of the target light-emitting pixels operate" include the situations that a part of the target light-emitting pixels operate while a part thereof do not operate, and all of the target light-emitting pixels operate. In both situations, the light-emitting areas can emit monochromatic detection light, but the difference is that the brightness or intensity of the monochromatic detection light is different.

The under-screen optical fingerprint identification apparatus according to the embodiments of the present disclosure may also have a resting state. The operating state may be a state when the fingerprint identification is implemented. Accordingly, the resting state is a state when the fingerprint identification is not required or not implemented. For example, the display screen is a touch display screen capable of switching the operating state of the under-screen optical fingerprint identification apparatus from a current mode to the operating state based on an action such as approaching, touching or pressing of the object to be identified or an internal program instruction of the electronic device. After the fingerprint identification is completed, the operating state of the under-screen optical fingerprint identification apparatus is switched to the resting state.

For example, in a scenario where the screen of the smart phone needs to be unlocked, the fingerprint contact identification area 4 is a self-luminous LED screen, and a current black screen state of the smart phone is the resting state. When the fingerprint contact recognition identification area 4 detects an action such as approaching, touching or pressing of the object to be identified, the target light-emitting pixels in the light-emitting areas included in the identification area 409 emit light, while the non-target light-emitting pixels do not emit light, thus illuminating the contact area 403. When the object to be identified pressing the contact area 403 is the user's real finger, the fingerprint identification is successful, and the screen unlocking is completed. Subsequently, the non-target light-emitting pixels in the light-emitting areas included in the identification area 409 also emit light to supplement the light intensity and achieve uniform display of the screen.

For another example, in a scenario where the smart phone makes a fingerprint payment, the fingerprint contact identification area 4 is a self-luminous OLED screen, and a current screen awake state of the smart phone is the resting state. At this time, all of the light-emitting pixels in the plurality of light-emitting areas included in the identification area 409 operate to emit white light. When a payment interface or a payment control pops up, the non-target light-emitting pixels in the plurality of light-emitting areas included in the identification area 409 are extinguished or their brightness is reduced, while the target light-emitting pixels continue to operate, so that different light-emitting areas emit different monochromatic detection light to illuminate the contact area 403. When the object to be identified pressing the contact area 403 is the user's real finger, the fingerprint identification is successful and the payment is completed. Subsequently, the non-target light-emitting pixels resume the operation, and the entire light-emitting areas emit white light to display the smart phone interface normally.

In the embodiment where the fingerprint contact identification area 4 is a part of the display screen self-contained by the electronic device, the light-emitting operation of the light-emitting layer 402 in the fingerprint contact identification area 4 may be controlled by an independent control module, which can control the light-emitting pixels included in the light-emitting layer 402 in the fingerprint contact identification area 4 to make an operation different from that of the pixels in other areas of the display screen. The above "difference" includes: the light-emitting order of the light-emitting pixels included in the light-emitting layer 402 in the fingerprint contact identification area 4 is different from that of the light-emitting pixels in other areas of the display screen; and the light-emitting colors of the light-emitting pixels included in the light-emitting layer 402 in the fingerprint contact identification area 4 are different from those of the light-emitting pixels in other areas of the display screen. For example, in the above scenario of unlocking the screen of the smart phone, in the current black screen state of the smart phone, the independent control module may control the light-emitting pixels included in the light-emitting areas in the fingerprint contact identification area 4 to emit light first (the light-transmitting area 404 emits light or does not emit light), and respective light-emitting areas in the fingerprint contact identification area 4 emit monochromatic light with wavebands not overlapping with each other, respectively.

In addition, the above "difference" refers to an operational difference between the light-emitting pixels included in the light-emitting layer 402 in the fingerprint contact identification area 4 and those in other areas of the display screen when the apparatus of this embodiment is in the operating state. When the electronic device to which the apparatus of this embodiment is applied is in a normal display state, the light-emitting pixels included in the light-emitting layer 402 in the fingerprint contact identification area 4 are in the same operation mode as those in other areas of the display screen. At this time, the light-emitting layer 402 in the fingerprint contact identification area 4 and other areas of the display screen may emit surface light for displaying, and the light is specifically white light.

Figure 9:
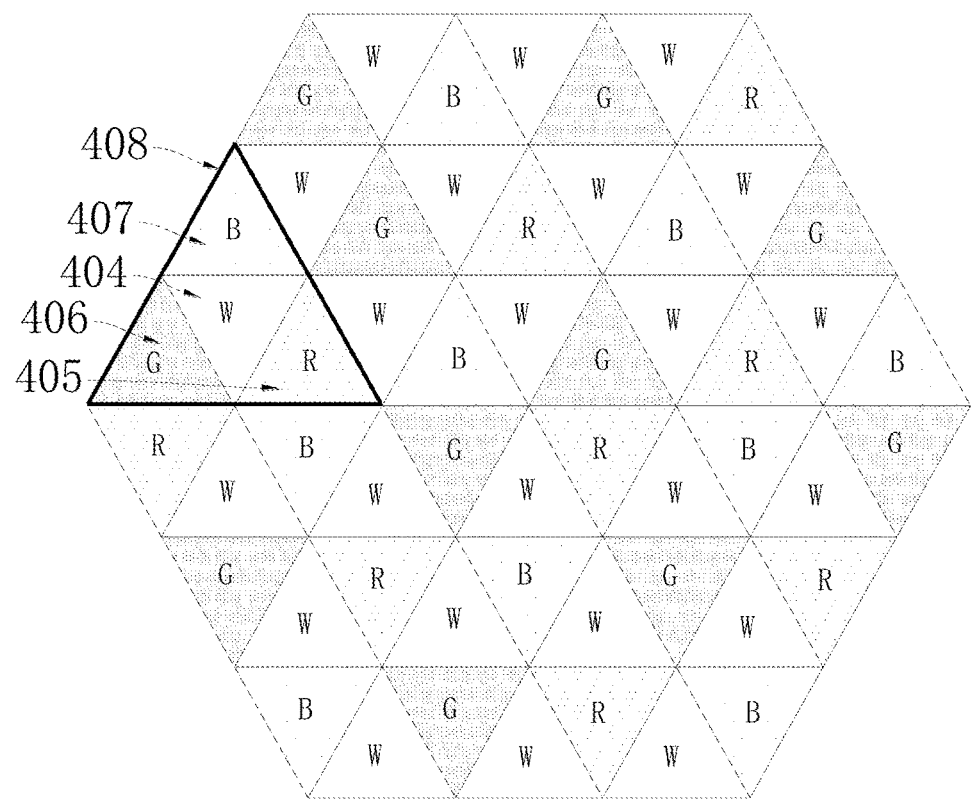
FIG. 9 illustrates a schematic structural diagram of a feasible light-emitting unit array.
Figure 10:
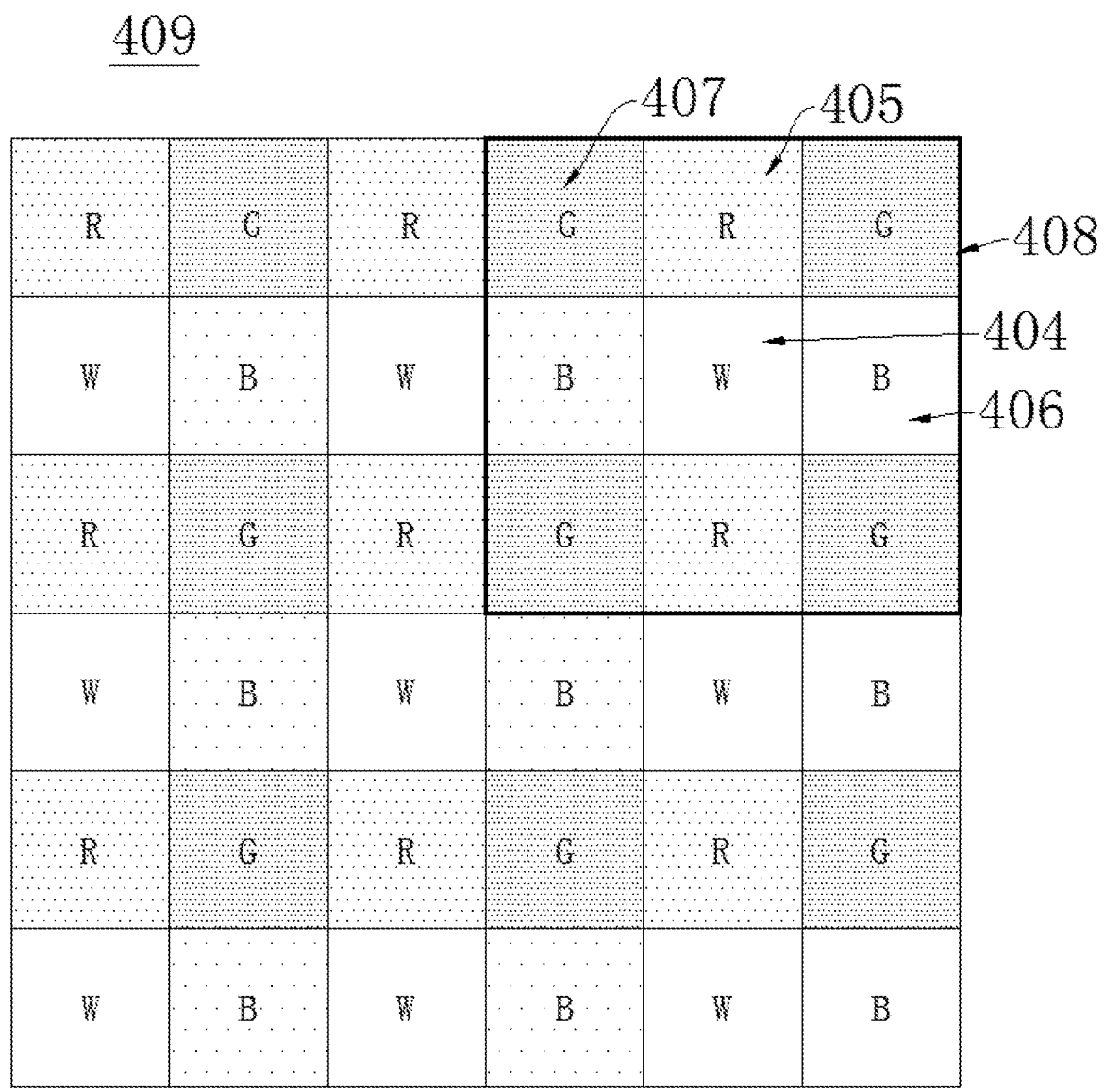
FIG. 10 illustrates a schematic structural diagram of another feasible light-emitting unit array.
Figure 11:
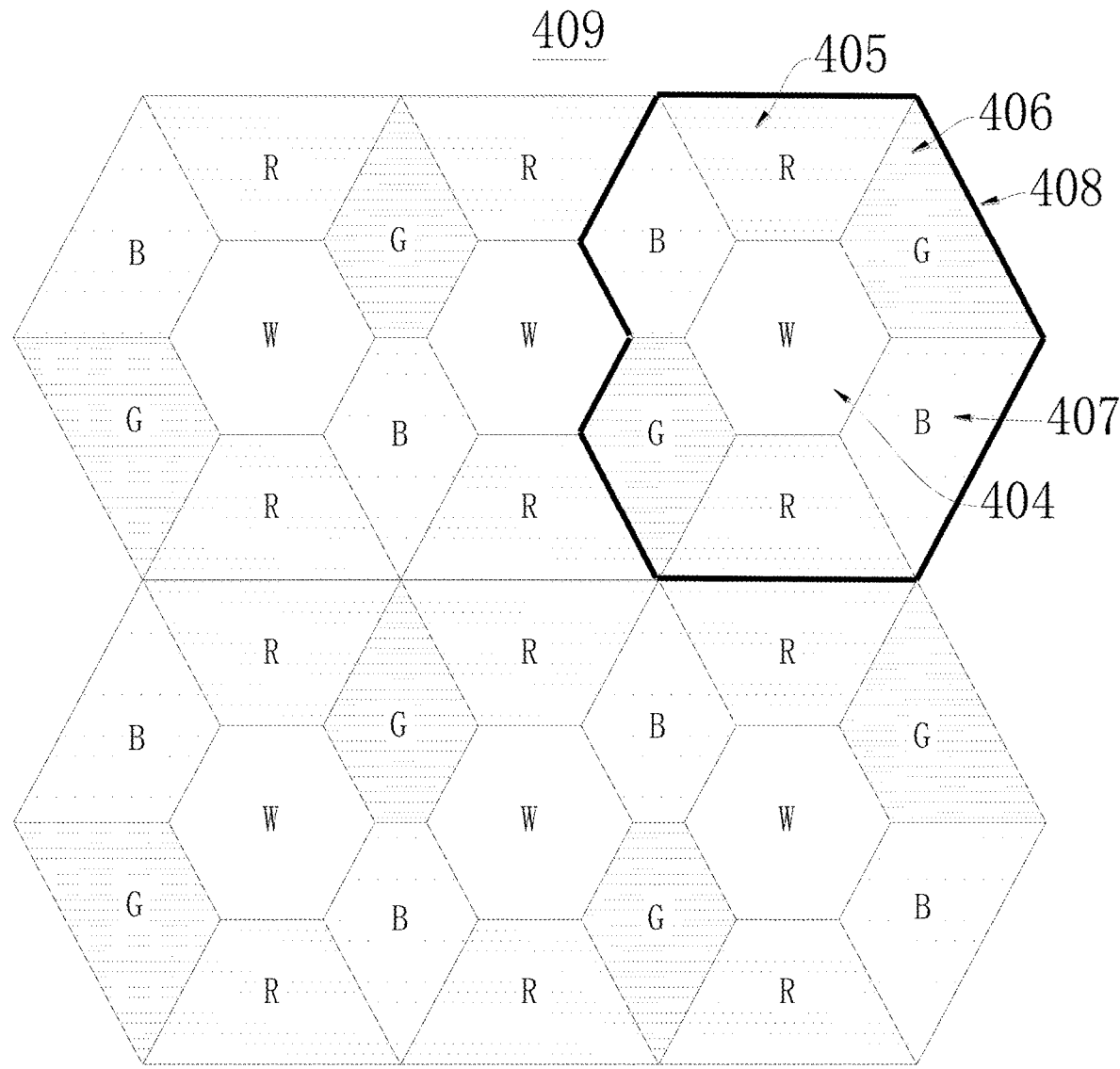
FIG. 11 illustrates a schematic structural diagram of yet another feasible light-emitting unit array.

In this embodiment, the target light-emitting pixels of different light-emitting areas may be different. For example, in the RGB light-emitting pixel array as illustrated in FIGS. 9 to 11, the target light-emitting pixels of the R light-emitting area (red light-emitting area) are R (red) pixels, while G (green) pixels and B (blue) pixels are the non-target light-emitting pixels.

Similarly, the target light-emitting pixels of the G light-emitting area (green light-emitting area) are G pixels, while R pixels and B pixels are the non-target light-emitting pixels. The target light-emitting pixels of the B light-emitting area (blue light-emitting area) are B pixels, while R pixels and G pixels are the non-target light-emitting pixels. For example, if all of the R pixels in the same light-emitting area operate while all other non-R pixels do not operate, the light-emitting area emits red detection light.

In this embodiment, at least three light-emitting areas are configured to emit detection light of corresponding wavebands, wherein the wavebands of detection light emitted by any two light-emitting areas do not overlap. Since the waveband of the light is corresponding to the color of the light, the non-overlapping wavebands of the detection light are manifested by the different colors of the detection light. For example, if the waveband is 610 nm to 760 nm, the detection light is red light. If the waveband is 510 nm to 550 nm, the detection light is green light. If the waveband is 430 nm to 490 nm, the detection light is blue light.

In this embodiment, the light emitted from the light-emitting areas includes detection light directed towards the contact area 403 (generally upward) and light propagating downward. The upward propagating detection light is reflected by the object to be identified in the contact area 403 to form signal light, which needs to propagate downward through the light-transmitting area 404 to be received by the photodetection array 5. Therefore, the signal light is useful light carrying a fingerprint signal. However, the downward propagating light directly emitted from the light-emitting area does not carry any fingerprint signal. Therefore, the downward propagating light is noise light, which will reduce a signal-to-noise ratio of the light received by the photodetection array 5 and should be removed.

For this reason, in some embodiments, in order to block the noise light emitted directly downward from the light-emitting area while ensuring the smooth passage of the signal light, a light-shielding layer structure may be provided between the light-emitting layer 402 and the photodetection array 5 to filter the non-signal light or the noise light mentioned above. As illustrated in FIGS. 2 and 3, between the light-emitting layer 402 and the micro-lens array 6, there may be provided a first light-shielding layer 2, on which first light-transmitting holes 202 one-to-one corresponding to the light-transmitting areas 404 of the plurality of light-emitting units 408 are provided. The first light-shielding layer 2 may be made of a light-proof material, or formed by coating light-shielding ink on any (light-transmitting or light-proof) material that can play a supporting role. The shape of the first light-transmitting hole 202 is preferably the same as that of the light-transmitting area 404, so that the first light-shielding layer 2 can maximize the transmission amount of the signal light while effectively blocking the noise light emitted downward from the light-emitting area. The first light-shielding layer 2 is thin in thickness and may be provided on a surface of the light-emitting layer 402 facing away from the cover layer 401, that is, a lower surface of the light-emitting layer 402, so as to form an integral structure with the light-emitting layer 402. Therefore, on the one hand, the entire thickness of the apparatus can be reduced, and on the other hand, light leakage that may be caused by the spacing between the first light-shielding layer 2 and the light-emitting layer 402 can be avoided to the greatest extent.

In the embodiment where the fingerprint contact identification area 4 is a part of the display screen self-contained by the electronic device, the light-emitting pixels in the light-emitting areas included in the light-emitting layer 402 of the fingerprint contact identification area 4 have not been specially improved. Then, when the light-emitting pixels in the light-emitting areas operate, surface light is emitted. That is, an angle of the light emitted from the light-emitting areas is non-selective or arbitrary. Therefore, the light emitted from the light-emitting areas towards the contact area 403 is not all detection light. Although most or even all of the light emitted upwardly can be reflected by the object to be identified to form emission light, the emission light is disordered due to the changes of the texture or the ridges and valleys of the object to be identified, and then it is reflected not only to the light-transmitting area 404, but also to the light-emitting areas. Therefore, not all of the reflection light is directed towards the light-transmitting area 404 and finally propagates downward through the light-transmitting area 404 to reach the photodetection array 5. In other words, among the light emitted upwardly, only the reflection light formed by the reflection of light at some specific angles by the object to be identified will be emitted to the light-transmitting area 404, and the emission light emitted to the light-transmitting area 404 is the final desired signal light. Accordingly, the emission light emitted to other light-emitting areas is not reflected from the detection light at these specific angles. Therefore, the reflection light also constitutes noise light. If the first light-shielding layer 2 is not provided, the noise light will also propagate downward through the corresponding light-emitting areas and reach the photodetection array 5, or the noise light will propagate downward through the light-transmitting area 404 after being reflected multiple times between the light-emitting layer 402 and the object to be identified, which will greatly interfere with the image structure output by the photodetection array 5, resulting in a poor imaging quality and even a failure of the fingerprint identification.

Therefore, according to the embodiment of the present disclosure, between the light-emitting layer 402 and the micro-lens array 6, there is provided the first light-shielding layer 2, on which the first light-transmitting holes 202 one-to-one corresponding to the light-transmitting areas 404 are provided. It is not only to block noise light emitted directly downward from the light-emitting areas, but another very important function is that among the upward light emitted from the light-emitting areas without selectivity or at arbitrary angles, the signal light, which is formed after the light at a specific angle is reflected by the object to be identified, can be emitted towards the light-transmitting area 404 and then propagate downward through the first light-transmitting hole 202, and the noise light emitted to other light-emitting areas, which is formed after the light at other angles is reflected by the object to be identified, is blocked by the first light-shielding layer 2. Therefore, by using the existing known structure, or the display screen which is a structure necessary for the electronic device to complete basic functions, it can realize the emission of detection light at a specific angle and the discrimination of signal light reflected using the detection light. In this way, the known or indispensable structure is fully utilized to realize more functions, and the structural design is ingenious and simple.

Described above is an embodiment which filters the non-signal light or noise light by providing a physical structure, i.e., a light-shielding layer, below the light-emitting layer 402. By adopting this embodiment, a signal-to-noise ratio of light received by the photodetection array 5 can be greatly improved, and the burden of filtering the noise light by the subsequent algorithm can be reduced, which is beneficial to obtain a high-quality image.

Of course, the filtering of the above-mentioned non-signal light or noise light is not limited to the above embodiment using the first light-shielding layer 2. In some other embodiments, the above-mentioned non-signal light or noise light may also be filtered by performing algorithm processing on the image output by the photodetection array 5. That is, in this embodiment, the above first light-shielding layer 2 may not be provided. Then, the light received by the photodetection array 5 includes the signal light propagating through the light-transmitting area 404, the noise light propagating through the light-emitting areas, and the noise light finally transmitted after being reflecting multiple times between the light-transmitting area 404 and the object to be identified. Thus, the subsequent algorithm can process such light, filter out other noise light, and only reserve the signal light.

As illustrated in FIGS. 9 to 11, in one embodiment, the light-emitting area may include a first-type light-emitting area 405, a second-type light-emitting area 406 and a third-type light-emitting area 407, which are respectively configured to emit detection light of first to third target wavebands which do not overlap with each other.

Following the above description, respective target light-emitting pixels included in the three types of light-emitting areas operate, while non-target pixels emitting light of other wavebands do not operate. The above three types of light-emitting areas respectively emit detection light of different target wavebands, and the detection light emitted by each type of light-emitting areas is the light with the same target waveband. For example, the first-type light-emitting area 405 emits red light (waveband: 610 nm to 760 nm), the second-type light-emitting area 406 emits green light (waveband: 510 nm to 550 nm), and the third-type light-emitting area 407 emits blue light (waveband: 430 nm to 490 nm).

As illustrated in FIG. 2, in one embodiment, the light-emitting pixel array 410 included in the light-transmitting area 404 does not operate when the light-emitting areas emit detection light of the target waveband or the under-screen optical fingerprint identification apparatus is in the operating state, that is, the light-transmitting area 404 does not emit light.

Of course, in another feasible embodiment, as illustrated in FIG. 3, the light-transmitting area 404 may also be configured to be capable of emitting detection light. Specifically, the light-emitting pixels included in the light-transmitting area 404 operate when the under-screen optical fingerprint identification apparatus is in the operating state, and emit fourth detection light of a fourth target waveband toward the contact area 403. In which, the fourth target waveband does not completely overlap with the waveband of the detection light emitted by any of at least three light-emitting areas.

As can be seen from the above, the wavebands of at least three detection light do not overlap with each other, and it is preferable that the three target wavebands are monochromatic light wavebands. In order to distinguish from the detection light of the at least three target wavebands which do not overlap with each other, the fourth target waveband does not completely overlap with any of the at least three target wavebands, which specifically includes the fourth target waveband not overlapping with any of the at least three target wavebands, or the fourth target waveband partially overlapping with at least one of the at least three target wavebands. Alternatively, the wavebands of the four detection light do not overlap with each other. Specifically, when the fourth detection light is monochromatic light, its color is different from those of the at least three detection light. For example, the monochromatic detection light corresponding to the three target wavebands may be red, green and blue light respectively, and the monochromatic detection light corresponding to the fourth target waveband may be yellow, purple or cyan light. The corresponding wavebands of the detection light at respective angles may be divided according to the number of angles for the detection light specifically to be emitted.

The fourth detection light may include any one of monochromatic light, polychromatic light or invisible light. In which, in an embodiment in which the fourth detection light is monochromatic light or invisible light, the fourth target waveband does not overlap with the wavebands of the at least three detection light at all. In a case where the three detection light is red, green and blue monochromatic detection light which are all visible light, when the fourth detection light is invisible light, its waveband does not overlap with the wavebands of the three detection light at all. For example, the fourth detection light is infrared light, far infrared light (waveband: >760 nm) or ultraviolet light (waveband: <380 nm).

In an embodiment in which the fourth detection light is polychromatic light, the fourth target waveband partially overlaps with the wavebands of the three monochromatic detection light. For example, the fourth detection light is white light (waveband: 280 nm to 760 nm), which covers the wavebands of the red, green and blue monochromatic detection light.

In a lighting cycle, the light-emitting modes of the light-emitting unit are roughly classified as follows: (1) the light-transmitting area does not emit light, while the other three types of light-emitting areas emit detection light of their respective target wavebands; (2) the light-transmitting area and the other three types of light-emitting areas all emit detection light of their respective target wavebands. Regardless of either of the above modes, the areas emitting the target detection light may emit light simultaneously or emit the detection light sequentially in chronological order; or, all of the light-emitting areas may emit light in sets in a preset sequence, for example, a first set consisting of the first-type light-emitting area and the second-type light-emitting area emits light earlier than a second set consisting of the third-type light-emitting area and the light-transmitting area. Some examples of the specific modes are further given as follows.

(1) The light-transmitting area 404 does not emit light, and the first-type light-emitting area 405, the second-type light-emitting area 406 and the third-type light-emitting area 407 simultaneously emit the detection light of their respective target wavebands, thereby emitting red, green and blue light respectively.

(2) The light-transmitting area 404 does not emit light, and the first-type light-emitting area 405, the second-type light-emitting area 406 and the third-type light-emitting area 407 sequentially emit the detection light of their respective target wavebands, that is, the light-emitting sequence is the first-type light-emitting area 405→the second-type light-emitting area 406→the third-type light-emitting area 407, thereby emitting red, green and blue light at corresponding timings T1, T2 and T3, respectively.

(3) The light-transmitting area 404, the first-type light-emitting area 405, the second-type light-emitting area 406 and the third-type light-emitting area 407 simultaneously emit the detection light of their respective target wavebands, thereby emitting infrared light, red, green and blue light, respectively.

(4) The light-transmitting area 404, the first-type light-emitting area 405, the second-type light-emitting area 406 and the third-type light-emitting area 407 sequentially emit the detection light of their respective target wavebands, that is, the light-emitting sequence is the light-transmitting area 404→the first-type light-emitting area 405→the second-type light-emitting area 406→the third-type light-emitting area 407, thereby emitting infrared light, red, green and blue light at corresponding timings T0, T1, T2 and T3, respectively.

In the above examples, there are only three types of light-emitting areas around the light-transmitting area. According to the to-be-restored three-dimensional image of the target finger to be detected, the number of the light-emitting areas around the light-transmitting area may be set according to actual needs, and for example, there may be four or five types of light-emitting areas.

In an embodiment in which the light-transmitting area 404 also emits light, since the light-transmitting area 404 performs both a light emission and a light transmission, it is needed to be avoided as much as possible the problem that signal light at different reflection angles is propagated to the photodetection array 5 simultaneously when the light-transmitting area 404 emits light simultaneously with the at least three other light-emitting areas, resulting in the crosstalk of the signal light at different angles, or the increase of the complexity of the corresponding pixels of the photodetection array 5 to receive the signal light at different angles. Therefore, in one embodiment in which the light-transmitting area 404 emits light, the light-transmitting area 404 does not emit light simultaneously with the at least three light-emitting areas. For example, the above case (4) is one of the feasible light-emitting time sequences. In addition, as long as the light-transmitting area 404 does not emit light simultaneously with the at least three light-emitting areas (no matter whether the at least three light-emitting areas emit light simultaneously), any other light-emitting time sequence is also a feasible embodiment.

For example, the light-transmitting area 404 emits light later than the at least three light-emitting areas (i.e., the at least three light-emitting areas emit light first, and the light-transmitting area 404 emits light last), the light-transmitting area 404 emits light later than one of the light-emitting areas (i.e., one of the light-emitting areas emits light first and then the light-transmitting area 404 emits light), the light-transmitting area 404 emits light later than two of the light-emitting areas (i.e., two of the light-emitting areas emit light first and then the light-transmitting area 404 emits light), and so on.

Since the ability of the photosensitive pixels of the photodetection array 5 to receive and process the signal light is certain, through the time sequence control where the light-transmitting area 404 and the at least three light-emitting areas do not simultaneously emit light, the signal light formed after the detection light emitted by the light-transmitting area 404 and the at least three light-emitting areas is reflected by the object to be identified will not overlap with each other on the time axis, so as to preventing a large amount of signal light from arriving at the photosensitive pixels simultaneously, thereby avoiding the problem of light crosstalk. In this way, the photosensitive pixels can process the signal light that arrives in sequence, thereby increasing the processing efficiency of the signal light to the greatest extent, and then improving the imaging quality.

The plurality of light-emitting units 408 included in the identification area 409 are arranged in an array. Similarly, the light-transmitting areas 404 and the light-emitting areas included in each of the light-emitting units 408 are also arranged in an array. In this way, the light-emitting unit 408, the light-transmitting area 404 and the light-emitting areas may be generally in a regular shape, which is convenient for the arrangement, and the arrangement density of the light-emitting units 408, the light-transmitting area 404 and the light-emitting areas can be increased, so as to avoid the phenomenon of uneven light emission caused by gaps between the adjacent light-emitting units 408, between the light-transmitting area 404 and the light-emitting areas, and between the adjacent light-emitting areas.

It should be noted that in an embodiment in which the fingerprint contact identification area 4 is a part of the display screen self-contained by the electronic device, the light-emitting layer 402 of the identification area 409 is correspondingly a part of the light-emitting layer (e.g., an OLED layer, and the light-emitting layer of the display screen is defined as a light-emitting panel for the sake of distinction) of the display screen. Then, the arrangement form of the light-emitting pixels in other areas of the light-emitting panel (i.e., other parts of the light-emitting panel except the light-emitting layer 402) may be exactly the same as that of the light-emitting pixels included in the light-emitting layer 402 of the identification area 409. That is, the embodiment of the present disclosure does not change the physical structure of the existing light-emitting panel of the display screen, but merely divides the light-emitting layer 402 below the contact area 403 pressed by the user's finger separately for fingerprint imaging, and adjusts the light-emitting wavebands and angles of the light-emitting areas included in different light-emitting units 408 of the identification area 409 (as will be described in detail below).

In short, the structure of the light-emitting unit in any other area of the light-emitting panel may be exactly the same as that of the light-emitting unit 408 in the identification area 409, and may also include a light-transmitting area and light-emitting areas surrounding the light-transmitting area. However, since other areas of the light-emitting panel need to be used for screen displaying, there are certain requirements for the light-emitting uniformity. Therefore, the light-emitting units in other areas of the light-emitting panel differ from the light-emitting units 408 in the identification area 409 in that the light-transmitting areas included in the light-emitting units in other areas of the light-emitting panel are preferably light-emitting, and the light emitted by the light-transmitting areas and light-emitting areas included in the light-emitting units in other areas of the light-emitting panel is preferably visible light convenient for displaying and visible to human eyes, such as white light.

In the above-mentioned embodiments, in order to block the noise light directly emitted downward from the light-emitting areas of the light-emitting layer 402, a light-shielding layer structure, i.e., a first light-shielding layer 2, is provided between the light-emitting layer 402 and the photodetection array 5. Similarly, in order to avoid the noise light emitted downward from other areas of the light-emitting panel, a light-shielding layer structure for blocking the downward propagation of light may be provided between the light-emitting panel and the photodetection array 5. Please refer to the schematic diagrams in FIGS. 2 and 3, in one embodiment, the light-shielding layer structure may include a first light-shielding layer 2, i.e., the first light-shielding layer 2 extends to the entire light-emitting panel. The first light-shielding layer 2 is not provided with the first light-transmitting hole 202 at other areas of the light-emitting panel. That is, the first light-shielding layer 2 wholly blocks the downward light-emission of the light-emitting panel (e.g., the first light-shielding layer 2 may be provided on the lower surface of the light-emitting panel), and the first light-transmitting holes 202 provided on the first light-shielding layer 2 are only corresponding to the light-transmitting area 404 in the identification area 409, while other areas of the first light-shielding layer 2 (which do not correspond to or are staggered from the light-transmitting area 404) are not provided with any hole structure. In this way, while ensuring that the light-emitting panel can provide a better display effect as a whole, the amount of noise light received by the photodetection array 5 is reduced, thereby increasing the signal-to-noise ratio of the light received by the photodetection array 5, and then improving the quality of the fingerprint image.

Described above is an embodiment in which one light-shielding structure, i.e., a first light-shielding layer 2, is adopted to simultaneously shield light from other areas of the display panel and all of the light-emitting areas in the identification area 409, but the embodiments of the present invention are not limited thereto. In practice, the light-shielding structure for other areas of the display panel may be additionally provided, in a structure different from that of the first light-shielding layer 2. Specifically, the additionally provided light-shielding structure may be attached to the lower surfaces of other areas of the display panel.

Of course, the light for fingerprint identification also has certain requirements for the uniformity. Therefore, in order to improve the light-emitting uniformity of the identification area 409, the light-transmitting area 404 is surrounded by three types of light-emitting areas, and located at the center of the light-emitting unit 408. In this way, the light-emitting areas for emitting detection light are uniformly arranged along a circumferential direction, which can improve the uniformity of the detection light.

As illustrated in FIG. 9, in one embodiment, the light-transmitting area 404, the light-emitting areas and the light-emitting unit 408 each may have a regularly triangular shape. There are three light-emitting areas, each having a side coincided with the side of the light-transmitting area 404. Generally, it can be understood that three median lines of the light-emitting unit 408 in a regularly triangular shape divide the light-emitting unit 408 into four congruent regular triangle areas, in which a regular triangle area located in the center, that is, defined by the three median lines, is the light-transmitting area 404, while the other three regular triangle areas located at the edge and respectively sharing vertexes with the light-emitting unit 408 are the light-emitting areas. In this way, the three light-emitting areas surround the light-transmitting area 404 in the central area of the light-emitting unit 408.

As illustrated in FIG. 10, in another embodiment, the light-transmitting area 404, the light-emitting areas and the light-emitting unit 408 each have a quadrangular shape. There are eight light-emitting areas, namely, two first-type light-emitting areas 405, two second-type light-emitting areas 406 and four third-type light-emitting areas 407. The light-transmitting area 404 has two opposite first sides and two opposite second sides; the two first-type light-emitting areas 405 each have a side coincided with the first side, the two second-type light-emitting areas 406 each have a side coincided with the second side, and the four third-type light-emitting areas 407 are respectively located at four corners of the light-transmitting area 404 and each have two sides coincided with the sides of the first-type light-emitting areas 405 and the second-type light-emitting areas 406.

In this embodiment, the light-transmitting area 404 and the light-emitting areas are further arranged in a matrix form. Generally, it can be understood that the light-emitting areas in a quadrangular shape (preferably a regularly quadrangular shape) is equally divided into nine parts to form a 3×3 matrix area. In which, the light-transmitting area 404 is located at a center of the 3×3 matrix, the two first-type light-emitting areas 405 are located at upper and lower sides of the light-transmitting area 404, the two second-type light-emitting areas 406 are located at left and right sides of the light-transmitting area 404, and the four third-type light-emitting areas 407 are located at diagonal areas of the 3×3 matrix.

As will be described below, the light-emitting areas emit inclined detection light toward the contact area 403. That is, the detection light emitted by the three types of light-emitting areas around the light-transmitting area 404 all approaches toward a normal direction of the light-transmitting area 404. As illustrated in combination with FIG. 10, the two first-type light-emitting areas 405 and the two second-type light-emitting areas 406 are located on the two sides of the light-transmitting area 404, respectively, and the four third-type light-transmitting areas 407 are located at the four corners of the light-transmitting area 404. Therefore, as can be seen from the knowledge of spatial solid geometry, compared with the first-type light-emitting area 405 and the second-type light-emitting area 406, the third-type light-emitting area 407 located in the diagonal area has a longer propagation path of the emitted detection light, so the light loss is larger and the brightness reduction is greater. With the above matrix arrangement, the number of the third-type light-emitting areas 407 is larger, which can at least partially compensate for the light loss of the detection light emitted by the third-type light-emitting areas 407, and avoid a large difference in the light intensities of the detection light emitted by the three types of light-emitting areas.

As illustrated in FIG. 11, in yet another embodiment, the light-transmitting area 404 is in a regularly hexagonal shape, and has two opposite first sides, two opposite second sides and two opposite third sides. The number of the light-emitting areas is six, including two first-type light-emitting areas 405, two two-type light-emitting areas 406 and two three-type light-emitting areas 407. The two first-type light-emitting areas 405 each have a side coincided with the first side, the two second-type light-emitting areas 406 each have a side coincided with the second side, and the two third-type light-emitting areas 407 each have a side coincided with the third side.

In this embodiment, if one of the light-emitting units 408 is considered alone without considering that adjacent light-emitting units 408 have an overlapping area, the light-emitting unit 408 is substantially in a regularly hexagonal shape enlarged in equal proportion to the light-transmitting area 404. The light-emitting units 408 are connected to the six corners of the light-transmitting area 404, so that six areas which are generally isosceles trapezoids are formed between the light-emitting units 408 and the light-transmitting area 404, that is, three pairs of opposite areas which form the first-type light-emitting areas 405, the second-type light-emitting areas 406 and the third-type light-emitting areas 407 respectively.

Further, in order to avoid a gap between any adjacent light-emitting units 408, there is an overlapping area therebetween. Specifically, one corner of a light-emitting unit 408 is exactly located in the center of two adjacent light-emitting units 408 on the left and right. In this way, the light-emitting area between the two adjacent light-emitting units 408 is an overlapping area, which is an irregular quadrangle and shared by the two adjacent light-emitting units 408.

To realize the collection of three-dimensional fingerprint images, the embodiments of the present disclosure provide the following solutions.

As illustrated in FIGS. 6 to 8, the photodetection array is provided with photosensitive areas 502 arranged in an array. The photosensitive area 502 is provided with at least three different types of filter layers on a surface thereof. In order to reduce the thickness of the entire apparatus, corresponding coating may also be directly carried out on the surface of the photosensitive area to form pixel receiving points corresponding to the detection light of different wavebands. At this time, the filter layer may be formed as a part of the structure of the photodetection array 5. In the embodiments illustrated in FIGS. 2 and 3, the normal of the light-transmitting area 404 is perpendicular to the cover layer 401. However, in other embodiments, in order to realize the setting of detection light at different angles, the light-transmitting area 404 may be in a preset angle with the contact area in the cover layer 401.

An optical structure part needs to be provided between the photodetection array and the light-emitting layer, the optical structure part may include the light-shielding layer structure described in the above embodiments or other optical structures for improving the imaging quality of the photodetection array. In order to more clearly illustrate the structure of the photodetection array part to be described, the illustration of the optical structure part is omitted here.

When the under-screen optical fingerprint identification apparatus is in the operating state, at least three light-emitting areas emit three detection light of different wavebands to the object to be identified from three different angles, the detection light is reflected by the object to be identified to form signal light of corresponding wavebands, and the signal light propagates to the photosensitive area 502 after passing through the light-transmitting area 404 and the optical structure layer not illustrated. In this embodiment, at least three types of filter layers are correspondingly provided to correspond to the detection light at the three different angles, allowing the signal light of the corresponding wavebands to pass through and the signal light of other wavebands to be filtered, and the signal light passing through the filter layers reaches the photosensitive pixel array 501. That is, the photosensitive pixel array 501 under the at least three filter layers receives the signal light formed by the detection light at least three different incident angles being reflected by the object to be identified.

In this embodiment, the light-transmitting area 404 has a normal direction which is perpendicular to the contact area 403 of the cover layer 401, and the detection light emitted by the light-emitting areas propagates toward the contact area above the light-transmitting area 404. Preferably, an included angle between the detection light emitted by the light-emitting areas in each of the light-emitting units and the normal direction of the light-transmitting area 404 is between 40 degrees and 65 degrees. The angle of the detection light may be controlled by confirming a distance between the light-emitting layer and the cover layer and/or a size of the target pixels in the light-emitting unit.

In one embodiment, the light-emitting pixels in the identification area of the light-emitting layer are not specially changed in the physical structure relative to other light-emitting pixels in other light-emitting layers, for example, they are all made of light-emitting pixels in the OLED. In order that the target pixels in different light-emitting areas of the identification area in the OLED light-emitting layer generate the detection light of corresponding angles, a light-shielding layer, i.e., the first light-shielding layer 2 mentioned above, needs to be provided below the light-emitting areas in the light-emitting unit, so as to prevent the signal light, which is formed by the detection light of a non-preset angle emitted by the target pixels in the light-emitting units of the identification area being reflected by the object to be identified on the contact area, from propagating to the photodetection array through an area other than the light-transmitting area. In which, the included angles between the detection light emitted by at least three light-emitting areas in one light-emitting unit and the normal direction of the light-transmitting area 404 may be equal to or different from each other, which is not limited in this embodiment.

As illustrated in FIG. 3, in an embodiment in which the light-transmitting area 404 can emit the fourth detection light, the fourth detection light is also incident in a direction of the contact area above the light-transmitting area 404, and the angle of the fourth detection light is parallel or forms a small angle with the central normal of the entire light-emitting unit.

In addition, corresponding to at least three light-emitting areas of each of the light-emitting units emitting detection light at three different angles, the photodetection array includes at least three types of pixels. Three different filter layers are provided on the surfaces of or above the three types of pixels, correspondingly allowing the detection light emitted by the three light-emitting areas to pass through. Therefore, in this embodiment, the types of pixels are corresponding to the types of light-emitting areas. In an embodiment in which the first-type light-emitting area 405, the second-type light-emitting area 406, and the third-type light-emitting area 407 included in the light-emitting area respectively emit detection light of the first to third target wavebands, the photodetection array 5 correspondingly includes first-type pixels 5031, second-type pixels 5032, and third-type pixels 5033 respectively configured to receive the signal light of the first to third target wavebands. Specifically, as illustrated in FIG. 8, three types of filter layers are respectively a first-type filter layer 801, a second-type filter layer 802 and a third-type filter layer 803 which are correspondingly provided on the first-type pixel 5031, the second-type pixel 5032 and the third-type pixel 5033. In other words, among all of the photosensitive pixels included in the photosensitive pixel array 501, the photosensitive pixels located under the first-type filter layer 801 are the first-type pixels 5031. Accordingly, the photosensitive pixels located under the first-type filter layer 801 and the third-type filter layer 803 are the first-type pixels 5031 and the third-type pixels 5033, respectively.

Further, the detection light or signal light of the first to third target wavebands are red light, green light and blue light, respectively. Accordingly, the first-type light-emitting area 405, the second-type light-emitting area 406 and the third-type light-emitting area 407 are red, green, and blue light-emitting areas, respectively; the first-type filter layer 801, the second-type filter layer 802 and the third-type filter layer 803 are red, green and blue filter layers, respectively; and the first-type pixels 5031, the second-type pixels 5032 and the third-type pixels 5033 can receive the red, green and blue signal light, respectively.

In other embodiments, if each of the light-emitting units can emit detection light at more than three angles, such as four angles, the light-transmitting area 404 in each of the light-emitting units emits fourth detection light at a fourth angle. The fourth detection light may be monochromatic light of a waveband separated from the wavebands of the detection light from the other three light-emitting areas. The photosensitive area 502 of the photodetection array is correspondingly provided with fourth-type pixels which only allow the signal light of a fourth target waveband to pass through while filtering the signal light of other wavebands, that is, a corresponding filter layer is provided on the fourth-type pixels. In which, the signal light of the fourth target waveband is the signal light formed by the fourth detection light being reflected by the object to be identified. For example, when the fourth detection light is yellow, purple or cyan monochromatic detection light, the filter layer on the fourth-type pixels is correspondingly a yellow, purple, or cyan filter layer.

In this way, in the embodiment where the fourth detection light emitted by the light-transmitting area 404 is monochromatic light, the four types of pixels in the photosensitive area of the photodetection array can receive the signal light of four different wavebands (or colors), which correspondingly is respectively the signal light formed by the detection light at four different incident angles being reflected by the object to be identified.

As illustrated in FIG. 6, in an embodiment in which the fourth detection light emitted by the light-transmitting area 404 is infrared detection light, an infrared cut-off filter layer 9 may be provided between the photodetection array 5 and the micro-lens array 6 to filter the signal light of the infrared waveband while allowing the signal light of other wavebands to pass through. The infrared cut-off filter layer 9 is provided with an infrared light-passage hole 901 corresponding to the light-transmitting area 404 and allowing the signal light of the infrared waveband to pass through.

In this embodiment, in order to reduce the thickness of the entire under-screen optical fingerprint identification apparatus, the infrared cut-off filter layer 9 may be combined with the three types of filter layers provided on the surfaces of or above the three types of pixels in the photodetection array into one layer, wherein the three types of filter layers may be provided in the same layer. In other embodiments, regardless of the thickness of the entire under-screen optical fingerprint identification apparatus, the infrared cut-off filter layer 9 is layered with the filter layer above the pixels. Further, a transparent medium may be provided between the infrared cut-off filter layer 9 and the filter layer above the pixels. Similarly, the infrared light-passage hole 901 of the infrared cut-off filter layer 9 may also be filled with the transparent medium.

In another feasible embodiment, corresponding fourth-type pixels 5034 are provided on the photosensitive area 502, and the fourth-type pixels 5034 only sense invisible light, while the other three types of pixels 5031, 5032 and 5033 can receive visible light. In this way, the infrared signal light, which is formed after the infrared detection light emitted by the light-transmitting area 404 is reflected by the user's finger, is transmitted through the light-transmitting area 404 and the optical structure layer, and then imaged on the fourth-type pixels 5034. In this embodiment, the fourth-type pixels 5034 in the photosensitive area 502 may be provided on the photosensitive area 502 corresponding to the infrared light-passage hole 901, for example, the fourth-type pixels 5034 are provided in a projection area of the infrared light-passage hole 901 that is vertically projected on the photosensitive area 502. The fourth-type pixels 5034 may not be provided with an infrared filter layer. Although the fourth-type pixels 5034 may receive the infrared signal light and signal light of other wavebands, it only senses the light intensity of the infrared signal light. Specifically, an element that allows infrared light to pass through but filters visible light, such as an infrared antireflection film, may be provided above or on the surfaces of the fourth-type pixels 5034.

In the above embodiment where the infrared cut-off filter layer 9 is provided, while an area of the infrared cut-off filter layer 9 not provided with the infrared light-passage hole 901 intercepts the infrared signal light, and at the same time, it may play a certain light-blocking effect on the propagation of visible signal light at other angles, resulting in a decrease in the luminous flux. In view of this, as illustrated in FIG. 7, in yet another feasible embodiment, the infrared cut-off filter layer 9 may not be provided between the photodetection array 5 and the micro-lens array 6. As illustrated in combination with FIG. 8, instead, an element that allows infrared light to pass through but can filter visible light, such as an infrared antireflection film 804, is provided on the photosensitive pixels corresponding to the light-transmitting area 404. In this way, the photosensitive pixels below the infrared antireflection film 804 is the fourth-type pixels 5034.

The filter layer described in the above embodiments filters signal light of other wavebands and only allows signal light of a specific waveband to pass through (e.g., the red filter layer only allows red signal light to pass through, and filters green, blue and infrared signal light), and the infrared antireflection film filters all visible signal light and only allows infrared signal light to pass through. Thus, each of the four types of pixels included in the photosensitive area 502 on the photodetection array 5 can receive the signal light of the corresponding waveband, which is formed after the detection light of the corresponding waveband is reflected by the object to be identified.

Similarly, according to the above embodiment, when the fourth detection light emitted by the light-transmitting area 404 is infrared light, the four types of pixels on the photodetection array 5 can also receive signal light of four different wavebands (or colors), which is the signal light formed by the detection light at four different incident angles being reflected by the object to be identified.

In an embodiment in which the fourth detection light emitted by the light-transmitting area 404 is polychromatic light (e.g., white light), the photosensitive pixel array 501 may also receive signal light of four different wavebands (or colors). In addition, since the polychromatic light contains the waveband of monochromatic light, when the fourth detection light is polychromatic light, it can supplement and enhance the brightness of the other three types of signal light.

As can be seen from the above embodiments, the light-transmitting area may serve as either a light-transmitting area or a light-emitting area in the light-emitting unit. The light-transmitting area may serve as the fourth light-emitting area in the light-emitting unit, and emit the detection light from the center of the light-emitting unit, with an angle which can just make up for the insufficient angles of the detection light generated by other light-emitting areas around the light-transmitting area. In order to reduce the complexity of designing the pixel types of the photodetection array, three types of pixels may still be adopted to receive the signal light at four different angles at different times. For example, the light-emitting areas around the periphery of the light-transmitting area emit a set of detection light simultaneously, and the photosensitive areas with pixels in numbers the same as that of the angles and types of the detection light receive this set of detection light, but at another time, the detection light at different angles is only emitted by the light-transmitting area, and at this time, the photosensitive area only receives the signal light at an emission angle of the light-transmitting area. In this way, it is possible to collect the appearance of the surface fingerprint of the object to be identified, which is measured through different angles of detection light, by using the photosensitive areas of this photodetection array with fewer types of pixels.

With this structural design, each type of pixels of the photodetection array 5 receive signal light of a single waveband range or a single color. In an embodiment in which the light-emitting areas includes three types of light-emitting areas and the light-transmitting area 404 does not emit light, the three types of pixels correspondingly receive signal light of three different wavebands. In a further embodiment where the light-transmitting area 404 emits infrared detection light, four types of pixels may be designed on the photodetection array 5 to receive signal light of four different wavebands.

The pixels under the same type of filter layers are the same type of pixels, which receive signal light of the same waveband range. Such signal light with the same waveband range is formed by the detection light at approximately equal incident angles and of substantially the same wavebands being reflected by the user's finger. Since the user's finger contains texture fluctuations of ridges and valleys, the direction of the signal light formed after the detection light at different angles is reflected by the user's finger becomes disordered. Such signal light with disordered reflection directions can only be identified by different types of pixels, so that all pixels of the same type can sense the intensity of signal light of the waveband and form an image output unit. Therefore, the photodetection array 5 comprises at least three such image output units. In a case where the light-transmitting area 404 emits the fourth detection light, the photodetection array 5 can form image output units with four or more angles by increasing the types of pixels or the operating time sequences of the photodetection array.

Figure 12:
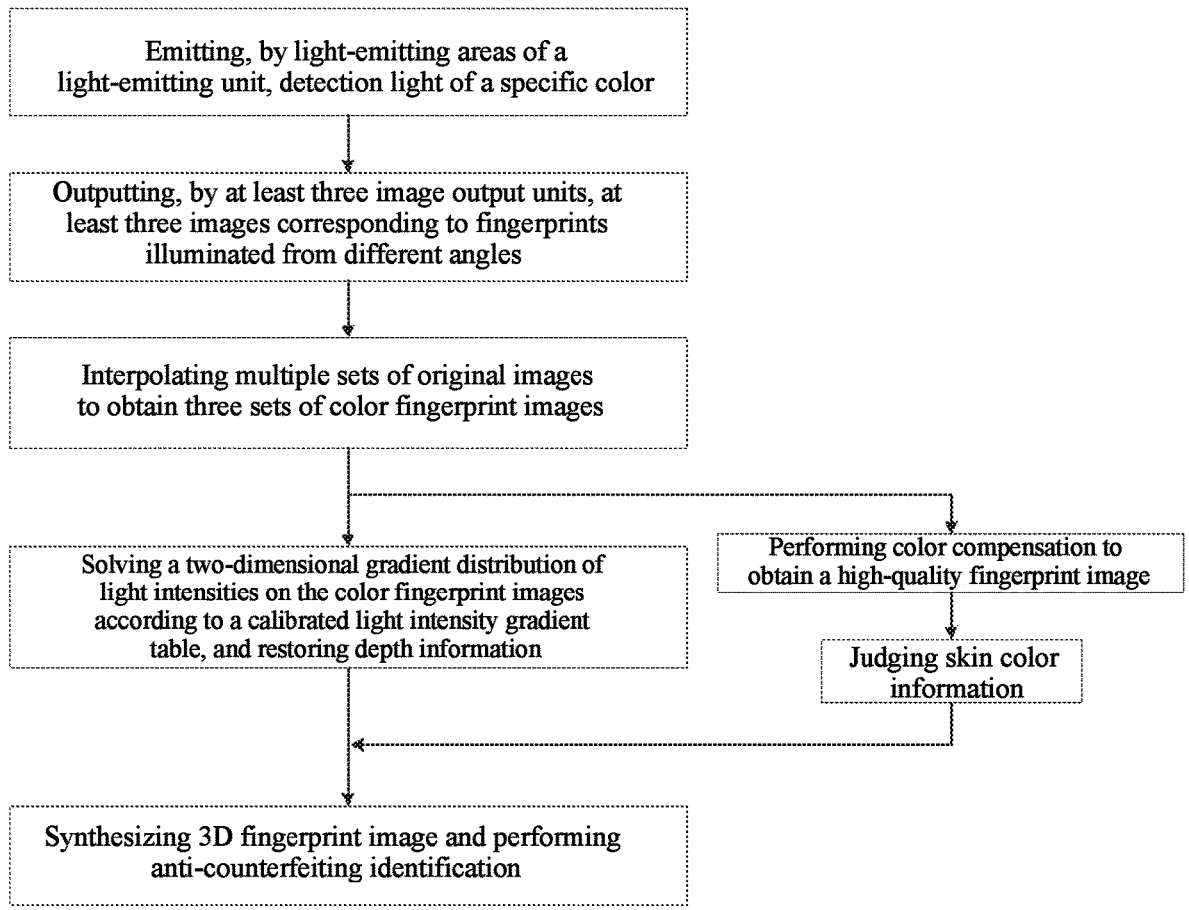
FIG. 12 illustrates a flowchart of a fingerprint identification method according to a non-limiting embodiment of the present disclosure.

As illustrated in FIG. 12, a fingerprint identification process of the embodiment of the present disclosure is as follows:

At least three light-emitting areas included in the light-emitting unit 408 are controlled to emit detection light of different wavebands, and the detection light is reflected by the object to be identified which presses the contact area 403 to form signal light of corresponding wavebands. The signal light passes through the light-transmitting area 404 and arrives corresponding photosensitive pixels after being filtered by the filter layer. Each of the image output units receives the signal light from the same waveband, outputs a set of original images of the corresponding waveband, thereby totally outputting at least three sets of original images.

Figure 5:
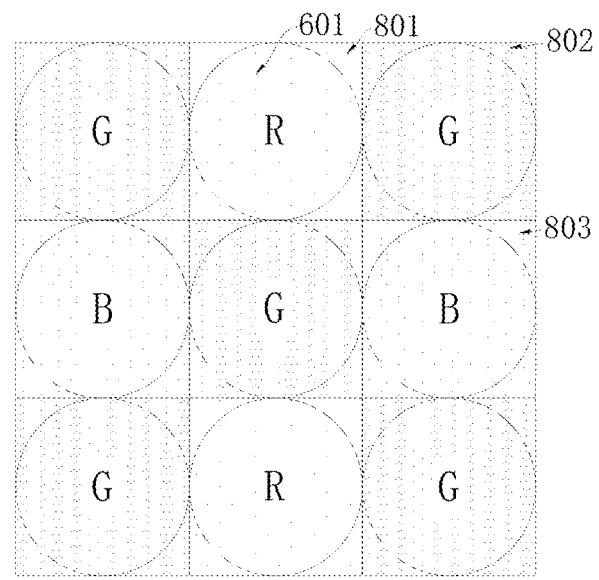
FIG. 5 illustrates a top view of the corresponding relationship between the micro-lens array and the photosensitive pixel array as illustrated in FIG. 4.

In which, each of the image output units performs interpolation (such as Bayer interpolation) operation based on the signal light received by itself from the same waveband and the signal light of other wavebands therearound, thereby obtaining an original image. For example, as illustrated in FIG. 5, a middlemost photosensitive pixel corresponding to a G (green) filter layer receives G signal light, its left and right photosensitive pixels receive B (blue) signal light, and its upper and lower photosensitive pixels receive R (red) signal light. Then, the photodetection array 5 performs interpolation operation based on the G signal light received by the middlemost photosensitive pixel, the B signal light received by the left and right photosensitive pixels, and the R signal light received by the upper and lower photosensitive pixels to obtain the original image output by the photosensitive pixel receiving the G signal light.

At least three image output units respectively output images corresponding to fingerprints illuminated at different angles. Subsequently, a color fingerprint image can be obtained according to three sets of original images output by the at least three image output units. Gradient information is solved using the color fingerprint image according to a light intensity gradient mapping table stored in a preset fingerprint information base, so as to restore depth information of the fingerprint, i.e., texture fluctuations of ridges and valleys of the fingerprint. In this way, a three-dimensional stereoscopic construction of the fingerprint image of the object to be identified is completed, and then the three-dimensional stereoscopic fingerprint image is used for anti-counterfeiting identification.

Subsequently, the constructed three-dimensional stereoscopic image is matched with a pre-stored fingerprint image to judge whether the object to be identified is the user's real finger. Specifically, if the matching is successful, it is judged that the object to be identified is the user's real finger. Otherwise, the object to be identified is not the user's real finger.

Further, according to the original images output by the at least three image output units, different phase compensations (such as displacements) and weighting (to compensate for the sensitivity difference in illuminances of different wavebands) may be performed, so that the quality of the three-dimensional stereoscopic image of the fingerprint can be improved and the skin color can be judged. Therefore, the skin color information of the finger is added to fingerprint identification to avoid attacks from fingerprint molds made of artificial materials such as silica gel and white glue, 3D printed prostheses, etc., thereby improving the anti-counterfeiting effect of fingerprint identification.

The under-screen optical fingerprint identification apparatus of the embodiments of the present disclosure reconstructs the three-dimensional stereoscopic features of the user's fingerprint by using multiple lights of different wavebands and at different incident angles, thereby improving the anti-counterfeiting effect of fingerprint identification.

It should be noted that in the description of the present disclosure, the terms such as "first" and "second" are only used for descriptive purposes and to distinguish similar objects. There is no sequence between the terms, and the terms cannot be understood as indicating or implying relative importance. In addition, in the description of the present disclosure, "a plurality of" means two or more unless otherwise specified.

Any numerical value cited herein includes all values of lower values and upper values which incremented by one unit from a lower limit value to an upper limit value, as long as there is an interval of at least two units between any lower value and any higher value. For example, if it is stated that the number of components or the value of a process variable (e.g., temperature, pressure, time, etc.) is from 1 to 90, preferably from 21 to 80, and more preferably from 30 to 70, the purpose is to indicate that the values such as 15 to 85, 22 to 68, 43 to 51, and 30 to 32 are also explicitly listed in the specification. For values less than 1, a unit is appropriately considered as 0.0001, 0.001, 0.01 or 0.1. These are only examples intended to be explicitly expressed, and it can be considered that any possible combination of numerical values listed between a lowest value and a highest value is explicitly elaborated in the specification in a similar way.

Unless otherwise specified, all ranges include endpoints and all numbers between the endpoints. "About" or "approximately" used with a range is suitable for both endpoints of the range. Thus, "about 20 to 30" is intended to cover "about 20 to about 30", including at least the indicated endpoints.

Those described above are just several embodiments of the prevent disclosure, and persons skilled in the art can make various changes or modifications to the embodiments of the present disclosure according to the contents disclosed in the application documents without departing from the spirit and scope of the present disclosure.

What is claimed is:

1. An under-screen optical fingerprint identification apparatus, wherein the under-screen optical fingerprint identification apparatus has at least an operating state, and comprises:
a photodetection array which has a photosensitive area on which a photosensitive pixel array is provided, wherein the photosensitive pixel array comprises at least three types of photosensitive pixels, and at least three different filter layers are correspondingly provided on surfaces of or above the three types of photosensitive pixels; and
a fingerprint contact identification area which is located above the photodetection array, wherein the fingerprint contact identification area comprises a light-emitting layer and a cover layer located thereabove, wherein the cover layer has a contact area to be contacted by an object to be identified, and the light-emitting layer has an identification area corresponding to the contact area, wherein the identification area comprises a plurality of light-emitting units, each of which comprises a light-transmitting area and at least three light-emitting areas located around the light-transmitting area, wherein the at least three light-emitting areas correspondingly emit detection light of different wavebands from at least three different angles relative to the contact area;
wherein when the under-screen optical fingerprint identification apparatus is in the operating state, the at least three light-emitting areas emit detection light to the object to be identified, and signal light formed by the detection light being reflected by the object to be identified propagates to the photosensitive pixel array through the light-transmitting area and the filter layers, wherein the three types of photosensitive pixels correspondingly receive the signal light formed by the detection light from at least three different incident angles being reflected by the object to be identified, wherein photosensitive pixels of the same type form an image output unit, and the photodetection array comprises at least three image output units, wherein each of the image output units receives signal light of the same waveband and outputs a set of original images of a corresponding waveband, wherein a three-dimensional stereoscopic image of the object to be identified is constructed according to the original images output by the at least three image output units.

2. The under-screen optical fingerprint identification apparatus according to claim 1, wherein an included angle between the detection light emitted by the light-emitting areas and a normal direction of the light-transmitting area is between 40 degrees and 65 degrees, wherein the normal direction of the light-transmitting area is perpendicular to the contact area.

3. The under-screen optical fingerprint identification apparatus according to claim 2, wherein a first light-shielding layer is provided between the light-emitting layer and the photodetection array, wherein the first light-shielding layer is provided with first light-transmitting holes one-to-one corresponding to respective light-transmitting areas of the plurality of light-emitting units, wherein the first light-shielding layer is provided on a surface of the light-emitting layer facing away from the cover layer.

4. The under-screen optical fingerprint identification apparatus according to claim 1, wherein the wavebands of the detection light emitted by any two of the light-emitting areas do not overlap.

5. The under-screen optical fingerprint identification apparatus according to claim 1, wherein a micro-lens array is provided between the photodetection array and the fingerprint contact identification area, wherein the micro-lens array comprises micro-lenses one-to-one corresponding to photosensitive pixels in the photosensitive pixel array.

6. The under-screen optical fingerprint identification apparatus according to claim 5, wherein a second light-shielding layer is provided between the micro-lens array and the photodetection array, wherein the second light-shielding layer is provided with second light-transmitting holes one-to-one corresponding to the photosensitive pixels and the micro-lenses.

7. The under-screen optical fingerprint identification apparatus according to claim 1, wherein the three different filter layers comprise: a first-type filter layer, a second-type filter layer and a third-type filter layer, which are respectively configured to allow signal light of at least part of a waveband range of corresponding three signal lights to pass through.

8. The under-screen optical fingerprint identification apparatus according to claim 7, wherein detection light of three different wavebands is red light, green light and blue light, respectively, and correspondingly, the first-type filter layer, the second-type filter layer and the third-type filter layer are a red filter layer, a green filter layer and a blue filter layer, respectively.

9. The under-screen optical fingerprint identification apparatus according to claim 1, wherein when the under-screen optical fingerprint identification apparatus is in the operating state, the light-transmitting area does not emit detection light.

10. The under-screen optical fingerprint identification apparatus according to claim 1, wherein when the under-screen optical fingerprint identification apparatus is in the operating state, the light-transmitting area emits fourth detection light, wherein an incident angle of the fourth detection light is different from that of the detection light emitted by the at least three light-emitting areas.

11. The under-screen optical fingerprint identification apparatus according to claim 10, wherein a waveband of the fourth detection light does not completely overlap with a waveband of any of the detection light emitted by the at least three light-emitting areas.

12. The under-screen optical fingerprint identification apparatus according to claim 10, wherein the fourth detection light comprises any one of monochromatic light, polychromatic light or invisible light.

13. The under-screen optical fingerprint identification apparatus according to claim 10, wherein the light-transmitting area and the at least three light-emitting areas do not emit light simultaneously.

14. The under-screen optical fingerprint identification apparatus according to claim 1, wherein the light-transmitting area is located at a center position of the light-emitting unit, and the at least three light-emitting areas are provided around the light-transmitting area in three different directions.

15. The under-screen optical fingerprint identification apparatus according to claim 14, wherein the light-transmitting area, the light-emitting areas and the light-emitting unit are all in a regular triangle shape or a quadrangular shape, or the light-transmitting area is in a regularly hexagonal shape,
wherein when the light-transmitting area, the light-emitting areas and the light-emitting unit are all in a regular triangle shape, the three light-emitting areas each have a side coincided with a side of the light-transmitting area, wherein when the light-transmitting area, the light-emitting areas and the light-emitting unit are all in a quadrangular shape, wherein the light-emitting areas comprise two first-type light-emitting areas, two second-type light-emitting areas and four third-type light-emitting areas, wherein the light-transmitting area has two opposite first sides and two opposite second sides, wherein the two first-type light-emitting areas each have a side coincided with the first side, the two second-type light-emitting areas each have a side coincided with the second side, and the four third-type light-emitting areas are respectively located at four corners of the light-transmitting area and each have two sides coincided with sides of the first-type light-emitting area and the second-type light-emitting area, wherein when the light-transmitting area is in a regularly hexagonal shape, the light-transmitting area has two opposite first sides, two opposite second sides and two opposite third sides, wherein the light-emitting areas comprises two first-type light-emitting areas, two second-type light-emitting areas and two third-type light-emitting areas, wherein the two first-type light-emitting areas each have a side coincided with the first side, the two second-type light-emitting areas each have a side coincided with the second side, and the two third-type light-emitting areas each have a side coincided with the third side.

16. A method for utilizing the under-screen optical fingerprint identification apparatus, wherein the method comprises the following steps:

controlling detection light of different wavebands emitted by at least three light-emitting areas in the plurality of light-emitting units to be incident at different angles onto the object to be identified which presses on the contact area, wherein the signal light formed by the detection light at different angles being reflected by the object to be identified passes through the light-transmitting area and the filter layers and then reaches corresponding types of photosensitive pixels; and receiving, by each of the image output units, signal light of the same waveband and outputting, by each of the image output units, a set of original images of a corresponding waveband;

constructing a three-dimensional stereoscopic image of the object to be identified according to the original images output by the at least three image output units.

17. The method according to claim 16, wherein after the step of constructing a three-dimensional stereoscopic image of the object to be identified, the method further comprises:

matching the constructed three-dimensional stereoscopic image with a pre-stored fingerprint image to judge whether the object to be identified is a user's real finger.

18. The method according to claim 17, wherein the step of constructing a three-dimensional stereoscopic image of the object to be identified comprises:

obtaining a color fingerprint image according to the original images output by the at least three image output units;

solving gradient information by using the color fingerprint image according to a light intensity gradient mapping table stored in a preset fingerprint information base, and restoring depth information of the object to be identified;

obtaining the three-dimensional stereoscopic image of the object to be identified according to the restored depth information of the object to be identified.

19. The method according to claim 18, wherein after the step of outputting, by each of the image output units, original images, the method further comprises:

performing phase compensation and weighting calculation on the original images to obtain a skin color of the object to be identified, wherein the step of matching with a fingerprint image comprises: matching the obtained skin color of the object to be identified with a skin color of the pre-stored fingerprint image to judge whether the object to be identified is a user's real finger.

20. An under-screen optical fingerprint identification apparatus, wherein the under-screen optical fingerprint identification apparatus has at least an operating state, and comprises:

a photodetection array which has a photosensitive area on which a photosensitive pixel array is provided, wherein the photosensitive pixel array comprises at least three types of photosensitive pixels, and at least three different filter layers are correspondingly provided on surfaces of or above the three types of photosensitive pixels; and a fingerprint contact identification area which is located above the photodetection array, wherein the fingerprint contact identification area comprises a light-emitting layer and a cover layer located thereabove, wherein the cover layer has a contact area to be contacted by an object to be identified, and the light-emitting layer has an identification area corresponding to the contact area, wherein the identification area comprises a plurality of light-emitting units, each of which comprises a light-transmitting area and at least three light-emitting areas located around the light-transmitting area, wherein the at least three light-emitting areas correspondingly emit detection light of different wavebands from at least three different angles relative to the contact area;

wherein when the under-screen optical fingerprint identification apparatus is in the operating state, the at least three light-emitting areas emit detection light to the object to be identified, and signal light formed by the detection light being reflected by the object to be identified propagates to the photosensitive pixel array through the light-transmitting area and the filter layers, wherein the three types of photosensitive pixels correspondingly receive the signal light formed by the detection light from at least three different incident angles being reflected by the object to be identified, wherein when the under-screen optical fingerprint identification apparatus is in the operating state, the light-transmitting area emits fourth detection light, wherein an incident angle of the fourth detection light is different from that of the detection light emitted by the at least three light-emitting areas.

* * * * *